(12) United States Patent
Thorn et al.

(10) Patent No.: US 7,076,742 B1
(45) Date of Patent: Jul. 11, 2006

(54) GENERATION ENGINE FOR A TREEMAP DISPLAY PAGE

(75) Inventors: Matthew Thorn, Livermore, CA (US); Donald Hoffman, Mountain View, CA (US); Daniel Perkel, San Francisco, CA (US)

(73) Assignee: The Hive Group, San Francisco, CA (US)

( * ) Notice: Subject to any disclaimer, the term of this patent is extended or adjusted under 35 U.S.C. 154(b) by 679 days.

(21) Appl. No.: 10/219,089

(22) Filed: Aug. 13, 2002

Related U.S. Application Data

(60) Provisional application No. 60/312,325, filed on Aug. 13, 2001.

(51) Int. Cl.
  *G06F 15/00* (2006.01)

(52) U.S. Cl. .................... 715/853; 715/851; 715/854

(58) Field of Classification Search ............... 715/853, 715/854, 763, 765, 851, 764
See application file for complete search history.

(56) References Cited

U.S. PATENT DOCUMENTS 6,583,794 B1 * 6/2003 Wattenberg ................. 715/708
6,724,403 B1 * 4/2004 Santoro et al. ............. 715/765

* cited by examiner

*Primary Examiner*—Cao (Kevin) Nguyen
(74) *Attorney, Agent, or Firm*—Fernandez & Associates, LLP

(57) ABSTRACT

A treemap generation engine enables a user of a treemap generation application to design a treemap display page by providing inputs that define the format of the treemap display page, as well as inputs that define the data to be represented by the treemap display page. Based on the inputs, the treemap generation application generates treemap display data that can be processed by a browser application to draw a treemap display page on a computer.

35 Claims, 26 Drawing Sheets

GENERATION ENGINE FOR A TREEMAP DISPLAY PAGE

REFERENCE TO RELATED APPLICATIONS

This application claims priority of co-pending U.S. Provisional Patent Application Ser. No. 60/312,325 entitled "Generation Engine for Treemap Display with Minimum Cell Size", filed Aug. 13, 2001. Priority of the filing date of Aug. 13, 2001 is hereby claimed, and the disclosure of said Provisional patent application is hereby incorporated by reference.

BACKGROUND OF THE INVENTION

1. Field of the Invention

This invention relates generally to the graphical display of data and, more particularly, to systems that produce graphical data displays.

2. Description of the Related Art

Modern enterprises are increasingly collecting vast amounts of data and storing the data in computer databases for later use. The data can relate to a variety of subject matter, such as business intelligence, customer relations, supply chain information, or any other subject. Although such data can provide a valuable knowledge platform for an enterprise, the vast amounts of data make it difficult for an enterprise to present the accumulated data in a comprehensible manner to those who can use the data. This is because enterprises typically lack the practical tools that would allow the enterprise to visually present the data in a manner that could be easily navigated and sorted by a user. As a result, the data is often unused by the enterprise.

One way of presenting vast amounts of data in an easily-digestible manner is by presenting the data in a treemap format. As used herein, a treemap is a visual representation of a hierarchical data set. Treemaps differ from the traditional textual methods of displaying data, which use lists and tables to present data. Such traditional methods often require several pages of convoluted lists and tables in order to represent different aspects of a large data set. In contrast, a treemap can compactly display various aspects of a data set using a collection of graphical representations on a single page. A treemap is particularly useful for displaying a hierarchically-organized data set.

A treemap 110 typically includes a collection of two-dimensional cells of rectangular shape, each of which represents a data element of the data set. The cells are gathered in the treemap in separate groups The cells that are within a common group all share a common type of attribute of the data set. The cells of a treemap typically have characteristics, such as size and color, that represent various attributes of the data. For example, the size of the cells can represent one attribute of the data and the color of the cells can represent another attribute of the data. Thus, a viewer of the treemap can gain insight into data attributes by examining the grouping, size, and color characteristics of the cells.

Thus, a treemap can be used to represent multiple aspects of large amounts of data in a compact and comprehensible manner. When the data is stored in an electronic format, a computer is typically used to generate a computer treemap display page, which is a page containing a treemap that is displayed on a computer screen, such as within the display window of a browser application.

One barrier to the wide use of treemap display pages is that getting the electronic data from a raw format (such as text data) into a treemap format is not an easy task. It usually requires a person with computer-programming knowledge and Web page markup language knowledge who can examine the data, format the data, and then write computer code in a markup language that can be properly processed and used to generate a treemap representation of the data on a computer display screen. This process can be time-consuming and expensive. Thus, although a treemap is an effective way of displaying data, enterprises tend to shy away from using computer-generated treemap display pages, as the time and effort of getting the raw data into a treemap display page can often outweigh the multitude of benefits associated with treemaps.

In view of the foregoing, there is a need for facilitating the creation of computer-renderable display pages that include a treemap representation of a data set.

SUMMARY

Disclosed are systems and methods that enable a user to author a treemap display page by providing a treemap configuration that defines the format of the treemap display page, as well as a data definition that defines the data to be represented by the treemap display page. Treemap display data, such as a markup language document, is generated from the treemap configuration definition and the data definition from automatic processing of the source data. The treemap display data can be processed by a browser application to draw a treemap display page that includes a treemap representation of the previously-defined set of data. In this way, a user can create data files for producing treemap display pages without particular knowledge or skills with markup languages.

Other features and advantages of the present invention should be apparent from the following description of the preferred embodiment, which illustrates, by way of example, the principles of the invention.

DETAILED DESCRIPTION

Figure 1:
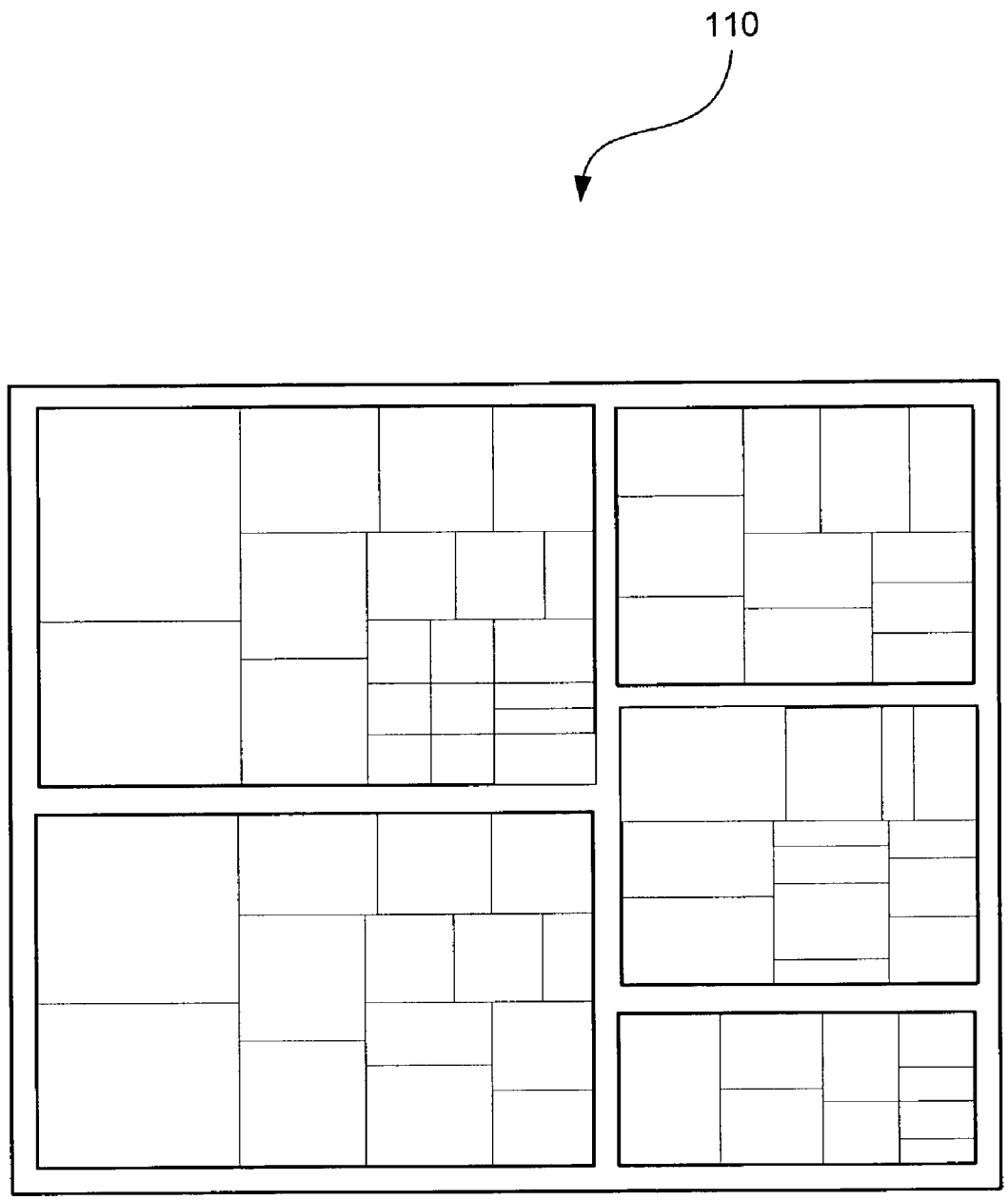
FIG. 1 shows an illustration of a treemap representation of a set of data.

Disclosed is an application that can be used to author a treemap display, such as the treemap display 110 shown in FIG. 1. The application is described herein as being a network-based application that operates in a client-server relationship, although the application can reside on a single computer.

Figure 2:
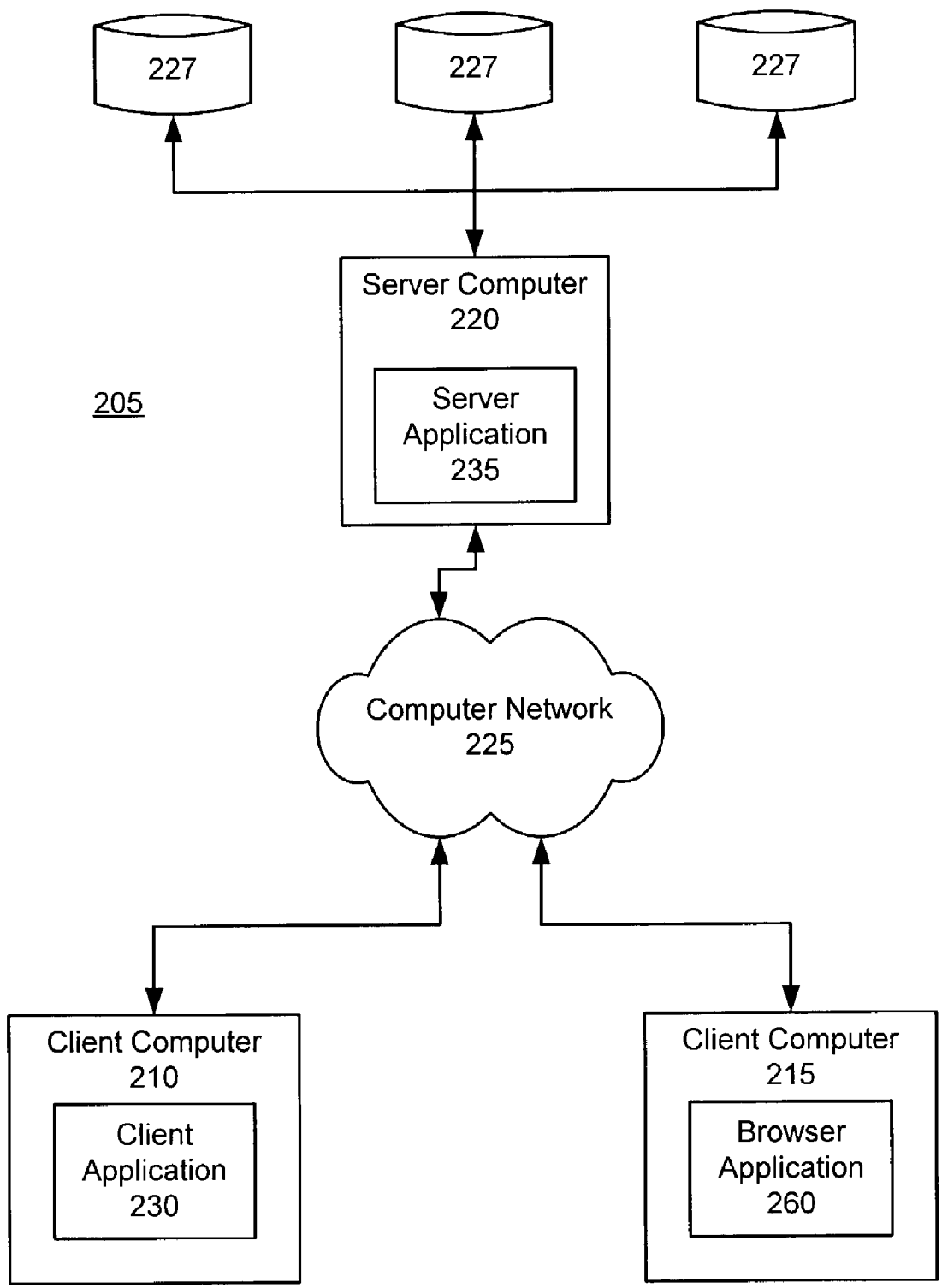
FIG. 2 shows a computer network system.

FIG. 2 is a block diagram of a computer network system 205 that includes a first client computer 210, a second client computer, 215, and a server computer 220, which are nodes of a computer network 225, such as the Internet. The computers 210, 215, 220 have access to data storage devices 227, which are shown in FIG. 2 attached to the server computer 220, although the storage devices 227 could be located anywhere on the network 225. Although FIG. 2 shows two client computers 210, 215 and a single server computer 220, it should be appreciated that the computer network system 205 could include any number of such devices.

The first client authoring computer 210 includes in memory a client authoring application 230. The client authoring application 230 is a software program that can be used to author a treemap display page in accordance with the invention. The client authoring application 230 receives inputs from a user, wherein the inputs at least partially define the format for a treemap display page that can be displayed on a computer, as described in more detail below. The inputs also define data that is to be represented by the treemap display page, such as, for example, data that is located in one of the data storage devices 227. The client authoring application 230 interacts with a server application 235, which is a software program that resides on the server computer 220.

The server application 235 receives data from the client authoring application 230. The server application 235 can store the data and generate an output that can be automatically processed by a conventional browser application 260 to display the previously-authored treemap display page on the client computer 215 (or any other computer that has a browser application 260), as described more fully below.

Exemplary Treemap Display Page

Figure 3:
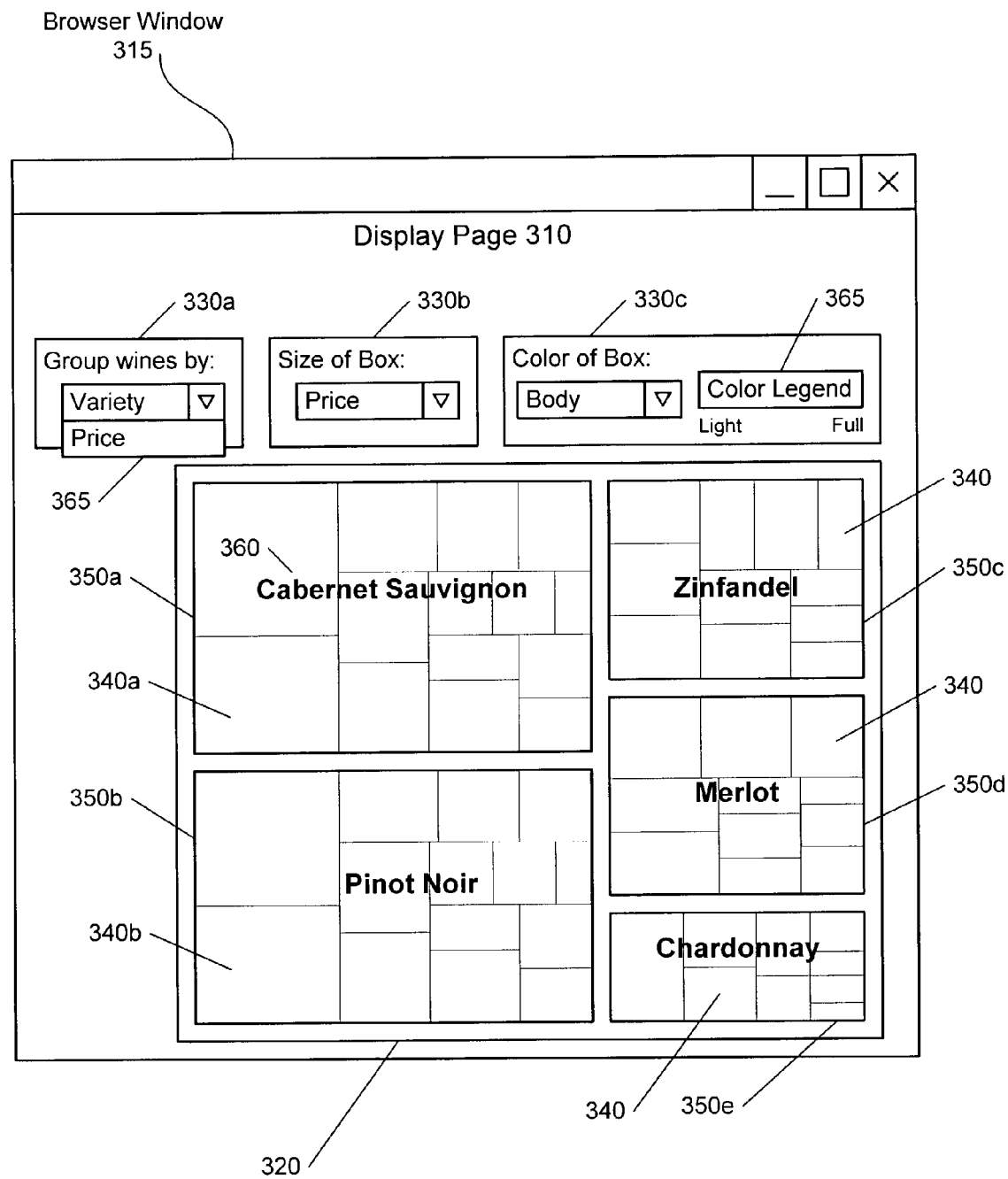
FIG. 3 shows a screenshot of an exemplary treemap display page.

FIG. 3 shows a screen shot of an exemplary treemap display page 310 as it would appear in a browser window 315 on a display screen of a browser application on a conventional computer, such as the client computer 215. The FIG. 3 screen shot represents a treemap display page produced by a conventional browser upon processing treemap display data produced in conjunction with the client authoring application 230. The display page 310 includes a treemap 320 comprised of a graphical representation of a set of data in a treemap format. The display page 310 can optionally further include other items, such as one or more menus 330a, 330b, and 330c (collectively referred to as "menus 330"). The menus 330 can be used to set the display configuration of the treemap 320, as described further below.

Figure 7:
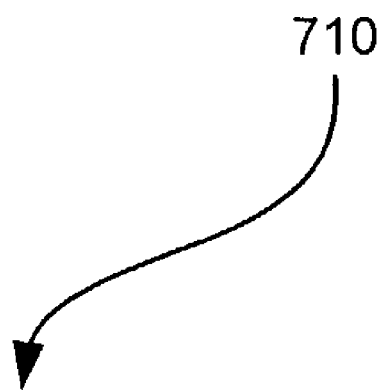
FIG. 7 shows an exemplary data table of a database.

For purposes of example, the treemap 320 is described herein as being representative of a set of data that relates to wine. The wine data can be originally contained in a database. As will be known to those of skill in the art, a database includes a set of data, which can be organized, for example, in one or more tables. Each table can be arranged in rows and columns wherein each row represents a single data element. Each data elements includes one or more attributes, as represented by the table columns. For example, FIG. 7 shows a table 710 that represents a database that includes the wine-related data represented by the treemap display page 310 of FIG. 3. Each row of the table 710 is a data element that represents a bottle of wine. The data element has attributes that include "Price", "Variety", and "Body". In an actual database, the attribute fields would be populated with data having a numerical or enumerated value.

With reference again to FIG. 3, the treemap 320 of the treemap display page 310 includes a plurality of rectangular-shaped cells 340, each comprised of a distinct, two-dimensional region of the display page 310. Each cell 340 represents a data element of the represented data set, as described more fully below. For ease of reference, the reference numeral 340 is used to collectively refer to the cells in general and individual cells are referred to using the reference numeral 340 followed by a letter suffix.

The cells 340 are grouped within the treemap 320 into one or more cell groups 350. Each cell group 350 represents a group of one or more data elements that share a common data attribute value (or range of values), as described further below. The illustrated embodiment includes five cell groups 350, including the cell groups 350a, 350b, 350c, 350d, and 350e. The cell groups 350 can each be surrounded by a pronounced border which serves as a visual designation of the respective cell group. The cells 340 within a particular cell group 350 are contained within the respective border of the cell group 350.

Each cell group 350 can have an associated label 360 that identifies the particular attribute value of the cells 340 contained in the cell group 350. In the treemap 320, the cells are grouped in groups 350 according to the "wine variety" attribute, such that cells 340 corresponding to data elements of a common wine variety value are contained within a common group 350. Thus, the cell group 350a has a label 360 that reads "Cabernet Sauvignon", the cell group 350*b* has a label that reads "Pinot Noir", the cell group 350*c* has a label that reads "Zinfandel", the cell group 350*d* has a label that reads "Merlot", and the cell group 350*e* has a label that reads "Chardonnay." In the embodiment shown in FIG. 3, the labels 360 are superimposed over the respective cell group. It should be appreciated that the labels can be positioned in other locations, such as adjacent the respective cell group 320.

Each cell 340 preferably has one or more characteristics that each represent an attribute of the associated data element. Such cell characteristics can include, for example, the cell size and the cell fill-color or fill-pattern. The cell size is the amount of two-dimensional display area that the cell consumes on a display screen. Thus, the size of a particular cell 340 represents the value of an attribute for the data element associated with that cell. For example, the size of the cells 340 in FIG. 3 can represent the value of a "price" attribute of the wine bottle data element associated with the cells. The cells 340 that have a larger size have a higher price than the cells with a smaller size. In this manner, a person viewing the display 310 can gain an idea of the relative prices of the wine bottles by examining the relative sizes of the cells 340.

As mentioned, the cell color is another cell characteristic that represents an attribute of the associated data element for the cell. The cell color is the particular color, shading, or fill-pattern contained within the boundaries of a cell 340. The particular color for a cell 340 represents the value of an attribute for the data element associated with the cell. The display page 310 can include a color legend 365 that identifies the mapping of the cell colors to the attribute values.

The menus 330 on the display page 310 allow a user to specify criteria that governs how the data in the represented data set is sorted and how the display page 310 is arranged. The menus 330 include a grouping menu 330*a* that enables a user to specify criteria for grouping the data elements in the represented data set. The grouping menu 330*a* includes a selector 365, such as a drop-down menu, through which a user can select a particular data element attribute by which the data elements (and the associated cells 340) are grouped. When the user selects a particular grouping attribute, the display page 310 is redrawn so that the cells 340 in the cell groups 350 are grouped according to the user-specified attribute of the corresponding data elements. For example, in FIG. 3 the grouping menu 330*a* allows the user to select either the "Variety" attribute or the "Price" attribute as the basis for grouping the cells 340. The display page 310 in FIG. 3 shows the cells 340 grouped according to the Variety attribute, so that the each cell group 350 includes cells 340 that represent wine bottles of a common variety.

Figure 4:
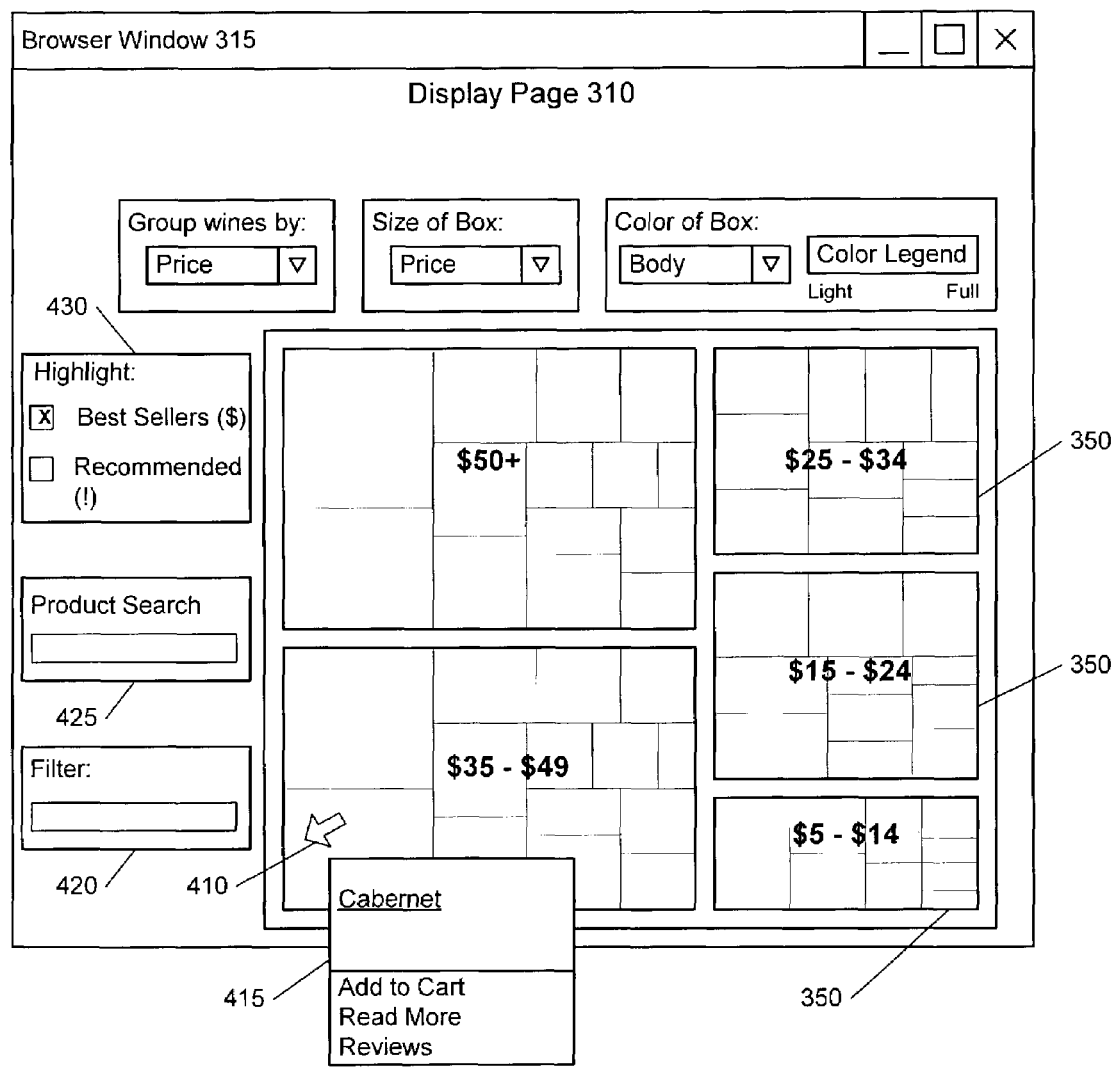
FIG. 4 shows another screenshot of an exemplary treemap display page.

FIG. 4 shows the display page 310 where the user selected "Price" as the criteria for grouping the cells 350. Thus, each cell group 350 includes a group of cells 340 that correspond to data elements for wine bottles of a particular price range. Note that the labels for the cell groups have changed to reflect the price range corresponding to each cell group.

With reference again to FIG. 3, the display page 310 also includes a sizing menu 330*b* that enables a user to specify the data element attribute that is represented by the size of the cells 340. The sizing menu 330 preferably includes a selector, such as a drop-down menu, through which the user can select the data attribute that is represented by cell size. In the embodiment shown in FIG. 3, the size of the cells 340 is indicative of the value of the "Price" attribute of the data element represented by the cells 340. The display page 310 also includes a coloring menu 330 through which the user can specify the data element attribute that is represented by the color of the cells 340.

With reference now to FIG. 4, a user can navigate a display cursor 410 to one of the cells and can view detailed information about the cell by designating that cell, such as by a display mouse click or moving a mouse over a cell. For example, FIG. 4 shows a mouseover box 415 that is displayed in response to designating a cell. The mouseover box 415 includes information regarding the designated corresponding cell. The mouseover box 415 also includes a menu of options. The user can select the options to perform certain actions, such as to view a Web page associated with the designated cell or to find similar Web pages.

With reference still to FIG. 4, the treemap display page 310 can also include filter fields 420 that allow a user to input filter criteria and filter cells to display only those cells that meet the user-specified criteria. The treemap display page 310 can also include a highlight control box 430 that allows a user to highlight all cells that meet a specified criteria. The highlight control box 430 can include a fixed criteria or a user-specified criteria that a user can activate, such as by clicking on an associated activation box. When the user activates the highlight criteria, then all cells that meet the selected highlight criteria will be distinguished in some manner, such as by marking the appropriate cells 340 with an icon or bolded border. The treemap display page 310 can also include a search control interface 425 that allows a user to search for data elements that match or relate to a search string. The search control interface comprises a field in which the user may enter alphanumeric characters that specify a search string.

System Architecture

Figure 5:
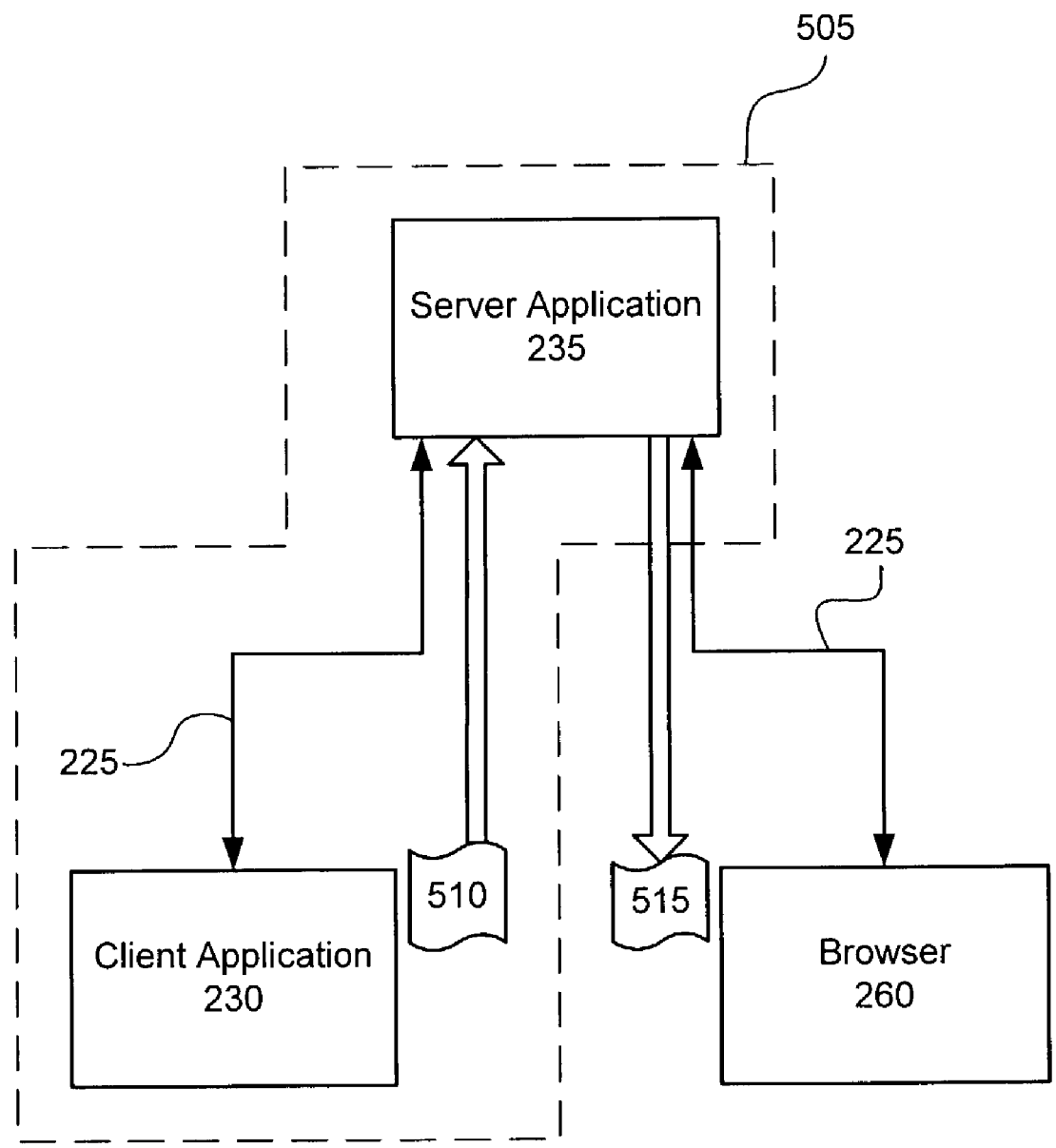
FIG. 5 shows a top-level architecture of a treemap display page authoring and display system.

FIG. 5 shows a top-level view of the system architecture of a treemap generation engine 505, which can be used to author and display a treemap display page of the type discussed above. The generation engine 505 includes the client authoring application 230 and the server application 235. The browser application 260 can process an output of the generation engine 505 to draw a treemap display page of the type discussed above. The applications 230, 235, 260 can communicate with each other over the computer network 225. Alternately, the applications 230, 235, 260 could be located on a single computer and combined into a single application.

As described in more detail below, a user of the client authoring application 230 can design a treemap display page by providing inputs that define the format of the treemap display page, as well as inputs that define the data to be represented by the treemap display page. If desired, the client authoring application 230 can provide default values for one or more of the input items. Based on the inputs, the client authoring application 230 generates a specification 510 that is forwarded to the server application 235. The server application 235 processes the specification 510 to generate treemap display data 515 (such as a markup language document) that is forwarded to the browser application 260. The treemap display data 515 can be processed by the browser application 260 to draw a treemap display page on the computer 210.

Server Application

Figure 6:
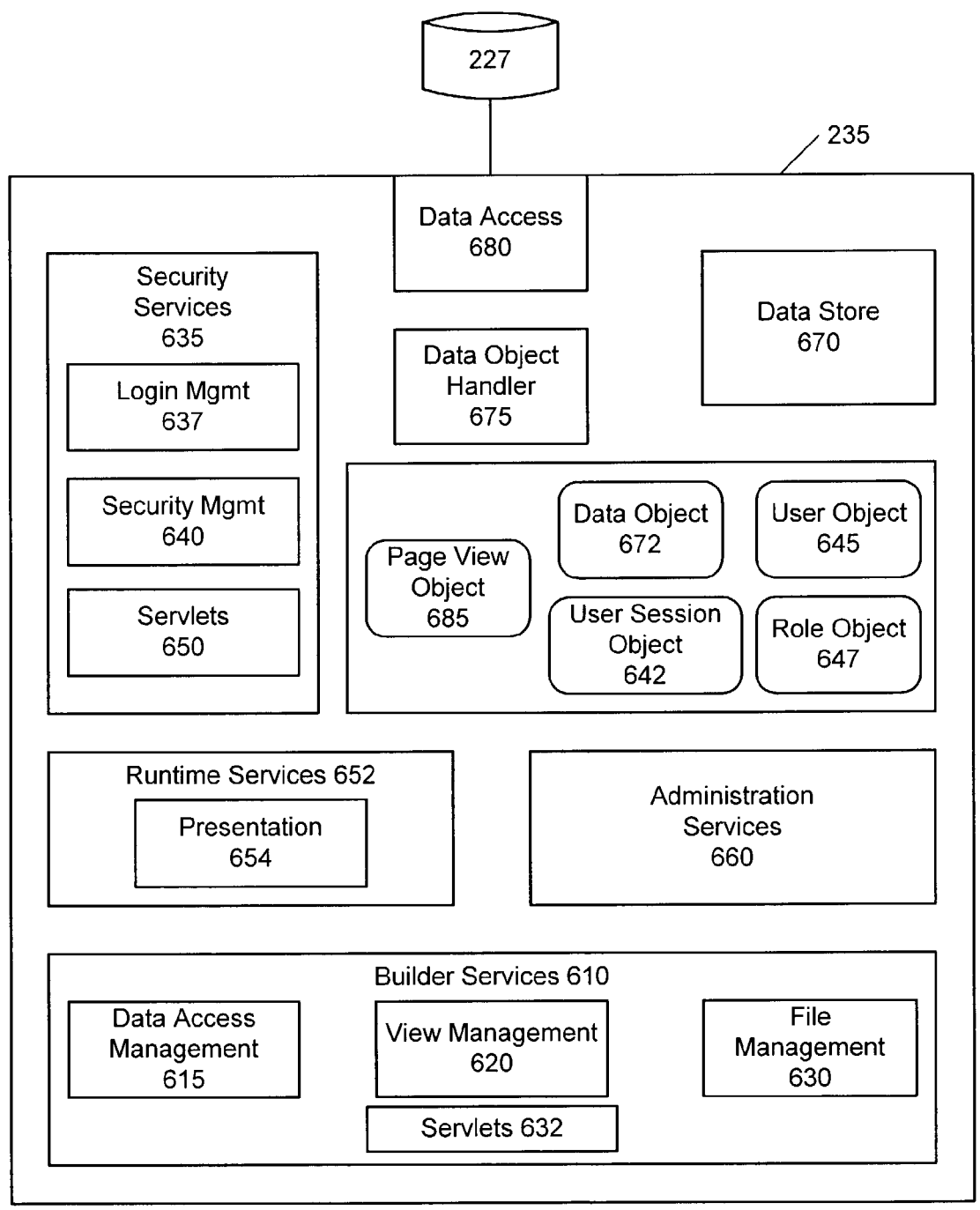
FIG. 6 shows an architectural diagram of a server application of the treemap display page authoring and display system.

FIG. 6 shows an exemplary architecture of the server application 235. The server application 235 includes builder services processes 610, which can include, for example, modules that interact with the client authoring application 230 in relation to the authoring of a treemap display page.

The builder services processes 610 include a data access management process 615, which manages the client application's access of data that will be represented by a treemap display page. A view management process 620 manages the client application's viewing of treemap display pages. A file management process 630 interacts with the client application 230 to provide graphical user interface pages (such as pursuant to a "wizard" process) used in authoring a treemap display page, as described more fully below. The various builder services processes 610 can be implemented using software modules and/or service servlets 632 that interact with the client application 230 over the computer network 225.

With reference still to FIG. 6, the server application 235 also includes security services processes 635 that handle security verifications in relation to user logins and logouts with the server application 235 via the client authoring application 230. The security services processes 635 can also handle security verifications regarding the viewing of authored treemaps and data related to treemaps, such as to verify that a viewing user is authorized to view a treemap and/or the associated data. The security services processes 635 include a login management process 637 that handles the login of users to the server application 235, such as by using a login name/password convention of the type known to those skilled in the art. A security management process 640 interacts with the login management process 637 to manage various user access rights for users that have logged onto the server application 235. The security management process 640 can create and maintain server side objects that assist in the management of users that have logged on. For example, a user session object 642 can be maintained to maintain data relating to a particular user session with the server application 235. A user object 645 can be maintained for each user that is authorized to log onto the server application 235. Each authorized user can have a corresponding role (as maintained in a role object 647) that constrains the type of interactions that a user can have with the server application 235, such as the type of data that can be viewed and the authoring and viewing rights of a user. The various security services processes 635 can be implemented using software modules and security servlets 650 that interact with the client application 230.

As shown in FIG. 6, the server application 235 also includes runtime services processes 652 that interact with the browser application 260 and the client authoring application 230 when an application seeks to display a treemap display page that has been authored using the client authoring application 230. The runtime services processes 652 include a treemap presentation process 654 that transmits treemap display data 515 to the application that seeks to display a treemap display page, as described more fully below. The runtime services processes 652 can interact with the security services processes 635 to verify that a requesting application has valid user session and roles necessary to allow access to a particular treemap display page and associated data. The runtime services processes 652 can also manage processes associated with viewing of treemap display pages that were authored without use of the client authoring application, such as treemap display pages that were "hand-coded."

The server application 235 also includes administration services processes 660 that handle the administration services of the server application 235. Such administration services can include, for example, the creation of authorized users, as well as the creation of one or more roles for each user. The administration services can also include the creation of data objects, which are described below.

As shown in FIG. 6, the server application 235 also includes a data store 670 that can be used to store various items of data, such as the objects that the server application 235 creates and maintains. The data store 670 can also be used to locally cache some or all of the data files that are transmitted to a client computer for drawing of a treemap display page.

With reference still to FIG. 6, the server application maintains one or more data objects 672. Each data object represents an abstraction of a data element and a representation of the attributes that are contained in an associated database of a data store 227 or 670. A user with administrative rights can define a data object 672 using an administrative interface to the server application 235. In one embodiment, the administrative user defines a data object by issuing a query to a database using a user interface on the client authoring application 230 (FIG. 2), which forwards the query to the builder services processes 610 of the server application 235. The server application 235 then queries the database, which returns a result set comprised of all the attributes within the database. The server application 235 then forwards the result set to the client authoring application 230. The user can then select which attributes from the database will form the data object being defined. Once a data object is created, it can be used to access the actual attribute values from a corresponding database. Thus, when the server application 235 needs to access data from a database, it first consults a corresponding data object.

The server application 235 includes a data object handler process 675 that interacts with the database(s) of the data stores 227 via a corresponding data object. The server application 235 can include one or more data access components 680 that function as an interface between a particular type of database and the data object handler. The data access components 680 thereby enable the server application 235 to communicate with difference types of databases, such as, for example, a structured query language (SQL) or other type of database that can respond to query requests. The database can be located in one or more of the data storage devices 227 or could be distributed through various locations on the network 225. The database can also comprise a virtual database utilizing data warehousing technology and online analytical processing (OLAP) that enables a multi-dimensional database.

The server application 235 also stores one or more page view objects 685. Each page view object corresponds to a treemap display page that was authored using the client authoring application 230. The page view object can include a plurality of attributes, such as a title attribute, a creator attribute (which identifies the name of the user that authored the treemap display page), and date attributes that identify creation and modification dates. The page view object also includes a reference to a specification 510 that defines the corresponding treemap display page. As described below, the specification 510 is created when an authoring user authors a treemap display page using the client authoring application 230. The specification 510 can be maintained in the data store 670.

Client Application

Figure 8:
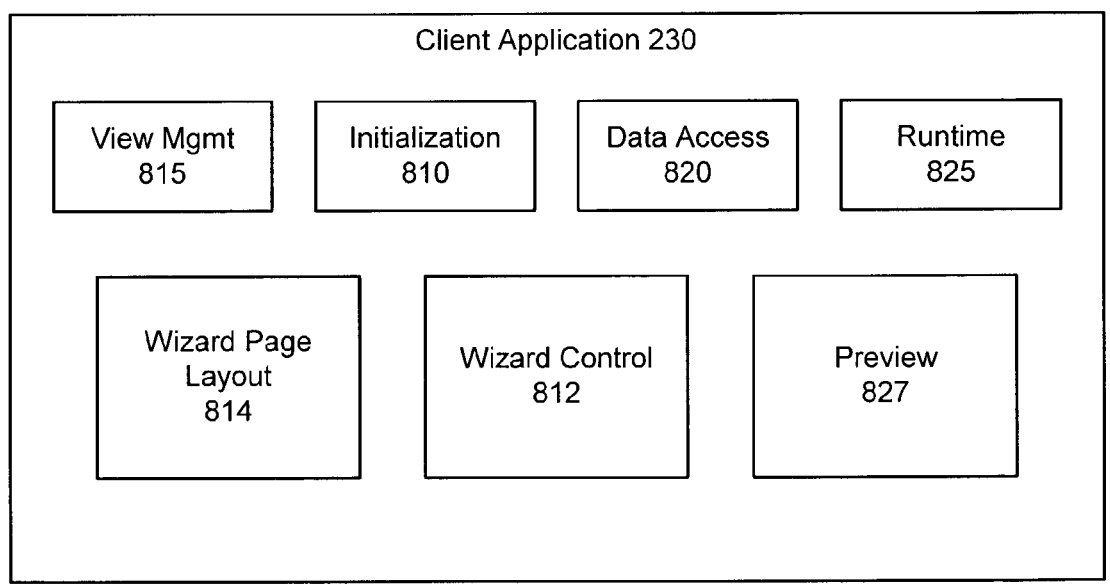
FIG. 8 shows an architectural diagram of a client application of the treemap display page authoring and display system.

FIG. 8 shows an exemplary functional architecture of the client authoring application 230. In one embodiment, the client authoring application 230 is a Web-based application that runs within a browser application on the computer 210. The Web-based client authoring application 230 can be implemented, for example, through the use of an applet that the server application 235 (through the builder services processes 610) serves to a browser located on the client machine 210.

The client authoring application 230 can optionally operate according to a "wizard" type utility that presents the user with a series of graphical user interface pages that step the user through particular tasks. In this regard, the client authoring application 230 includes an initialization process 810 that interfaces with the builder services processes 610 of the server application 235. The initialization process 810 obtains the pages that correspond to the particular wizard task that a user is performing. A wizard control process 812 can comprise a module that contains data relating to the particular order of steps in a wizard task. A wizard page layout process 814 interfaces with the wizard control process 812 during a wizard-assisted task. In this regard, the client authoring application 230 configures the wizard interface based on page descriptions that are received from the server application 235, such as via an eXtensible Markup Language (XML) file served by the server application 235.

The client authoring application 230 also includes a view management process 815 that interfaces with the view management process 620 of the server application 235. The view management process 620 obtains data from the server application 235 (such as the treemap display data 515) that enables the client application to display a treemap display page on the client computer 210.

As shown in FIG. 8, the client authoring application 230 also includes a data access process 820 that interfaces with the server application 235 for data-access related tasks. This includes when a user is defining data objects and when a user is accessing or defining data for authoring a treemap display page. The data access process 820 also interfaces with the wizard page layout process 814 to provide any necessary data during a wizard-assisted task. The client authoring application 230 also includes a runtime process 825 that interfaces with the runtime services 652 of the server application 235.

Treemap Display Page Authoring Process

Figure 9:
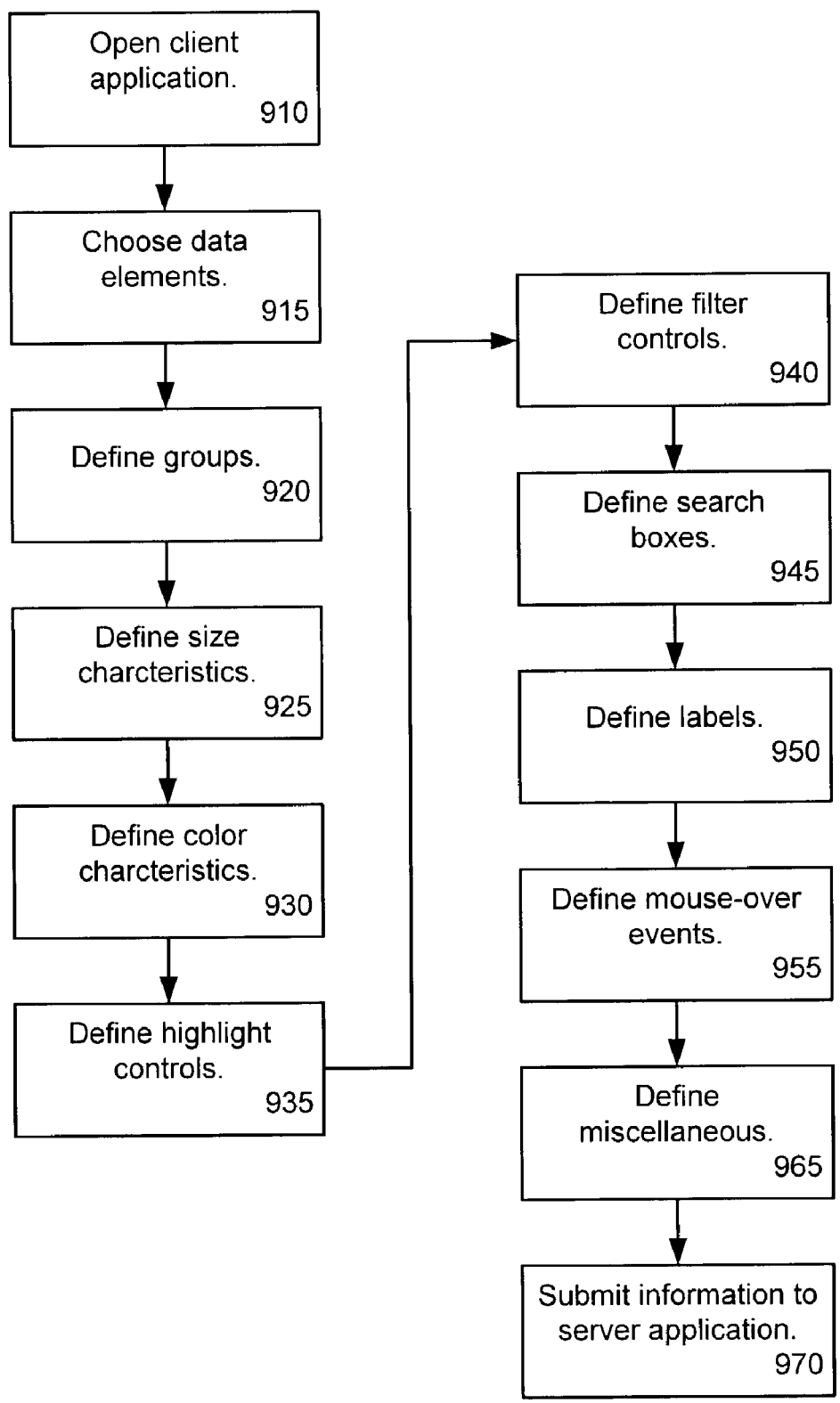
FIG. 9 shows a flow diagram that describes the operations involved with a process of authoring a treemap display page.

FIG. 9 is a flow diagram that describes the operations involved with the process of authoring a treemap display page using the client authoring application 230 and the server application 235. The process is performed by an authoring user that accesses the client authoring application 230 using the client computer 210 (shown in FIG. 2). According to the process, the authoring user provides one or more treemap configuration definitions, which are a set of definitions that define the format of a treemap display page in the context of a set of data, as described below. The authoring user also provides data definitions that define the set of data that is to be represented by the treemap display page. The authoring user can provide the definitions using an interface, such as a graphical user interface (GUI), that the client authoring application 230 causes to be displayed on a monitor of the client computer 210. Exemplary screen shots for a GUI are shown and described herein, although it should be appreciated that the user interface can vary from that shown. The interface does not require the authoring user to provide the inputs in a computer language format. In this regard, the interface can include selectable fields and menus that constrain the inputs that the authoring user provides in defining the data and treemap display page format.

In one embodiment, the client application 230 operates pursuant to a "wizard" type interface that assists the authoring user in authoring a treemap display page. The client application 230 presents the authoring user with one or more graphical user interfaces (such as display pages) that lead the authoring user through the steps of authoring the treemap display page. The graphical user interface can prompt the authoring user to provide information regarding the treemap configuration definition and the data definition. This can be accomplished, for example, as by presenting the authoring user with pages having selectable menu items, data fields, buttons, etc. that can be used to provide information regarding the configuration and data definitions.

With reference to FIG. 9, in the first operation, the authoring user opens the client authoring application 230 on the client computer 210, as represented by the flow diagram box numbered 910. As mentioned, the client authoring application 230 can be a Web-based application. In such a case, the authoring user opens a browser application in order to access the client authoring application 230, which can be an applet that is served to the client computer 210 from the server application 235 on the server computer 220. When the client authoring application 230 opens, it causes a GUI display screen to be displayed on client computer 210. The GUI can provide the authoring user with an option to begin authoring a new treemap display, such as by presenting the authoring user with one or more menu options.

In the next operation, the authoring user provides definitions for a set of data that is to be represented by the treemap display page, as represented by the flow diagram box numbered 915. The client authoring application 230 can present the user with a GUI page that allows the user to select a data set from a list of previously-identified data sets. In this regard, the client authoring application 230 presents the user with a list of data objects that have been previously-defined. As discussed above, a data object is an abstract representation of a set of data that includes one or more attributes. The user can then select a specific data object to be represented by the treemap display page.

Pursuant to the operation of the flow diagram box 910, the client authoring application 230 communicates over the network 225 to obtain the list of available data objects from the server application 235. The server application 235 can conduct one or more security checks to determine the data objects and attributes that the authoring user is authorized to access.

In the next operation, represented by the flow diagram box numbered 920, the authoring user defines the configuration for the groups that will be represented in the treemap display page. Pursuant to this operation, the authoring user identifies one or more attributes of the selected data object by which the cells in the treemap display page will be grouped, as well as the ranges of values for each group in the treemap display. For example, as shown in FIG. 3, the treemap display page 310 has five groups 350 of cells 340, wherein the cells have been grouped according to a "wine variety" attribute. During the authoring of the treemap display page 310, the authoring user would have identified the "wine variety" attribute as the basis for grouping cells pursuant to the operation of flow diagram box numbered 920.

Figure 10:
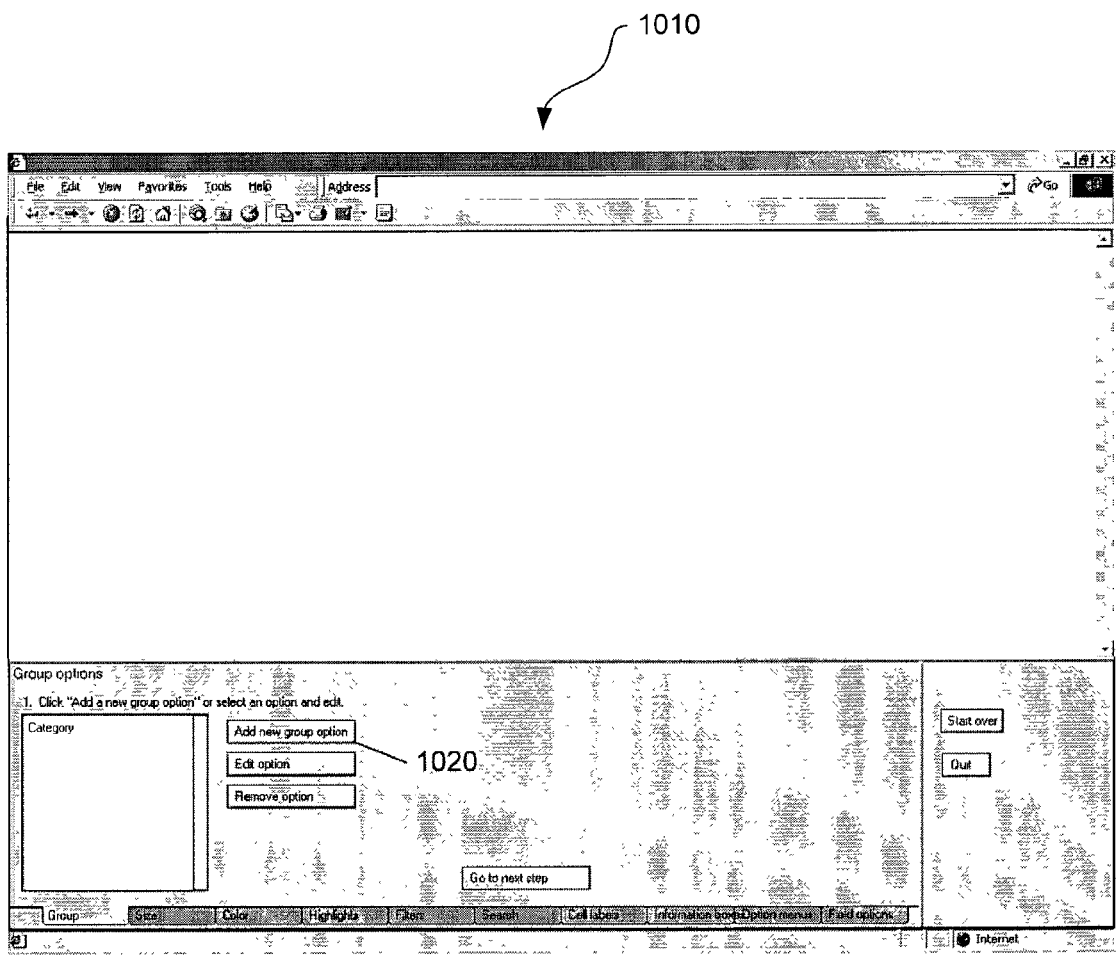
FIG. 10 shows a screen shot of a first group configuration page for providing group definitions for a treemap display page.
Figure 11:
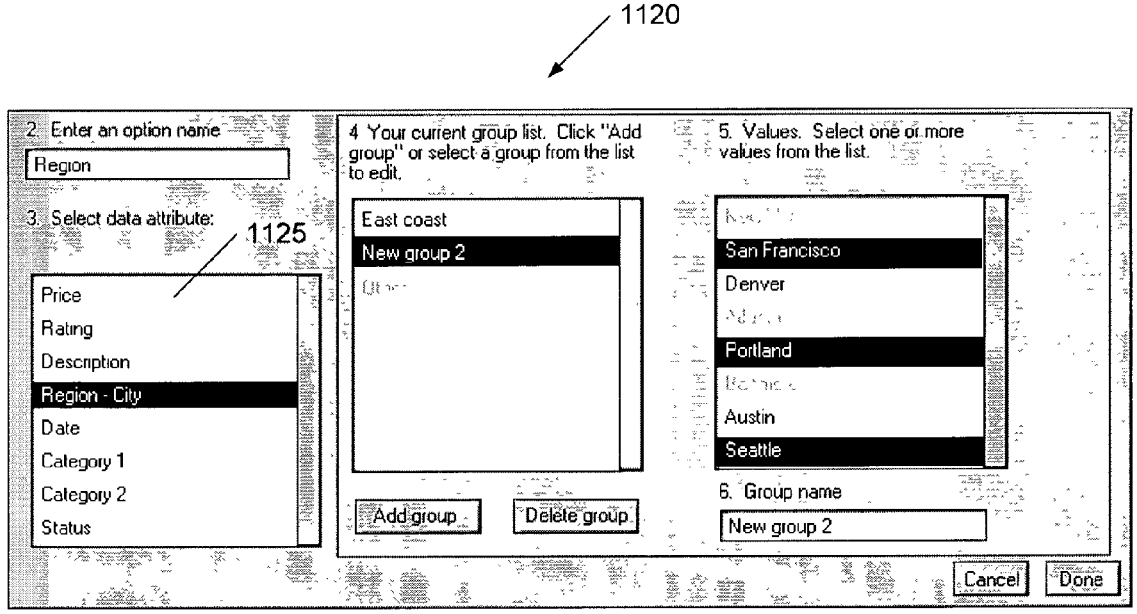
FIG. 11 shows a screen shot of a second group configuration page for providing group definitions for a treemap display page.

During this operation, the client authoring application 230 can present the authoring user with one or more GUI display pages that assist the authoring user in defining the group configuration for the treemap display page. FIG. 10 shows a first group configuration page 1010 that includes a button 1020 that can be selected by the authoring user to add a new grouping configuration to the treemap display page. When the authoring user selects the button 1020, the client authoring application 230 brings up a second display page 1120 (shown in FIG. 11) that includes a selectable menu 1125 of attributes by which the cells on the treemap display can be grouped. The client authoring application 230 can obtain the attributes by querying the server application 235 for the selected data object. The authoring user then selects an attribute that will be used to group the cells, and also defines the values or numeric range of attributes within each group.

In the next operation, represented by the flow diagram box numbered 925, the authoring user defines the size configuration for the treemap display page. Pursuant to this operation, the authoring user selects the data attribute that will be represented by the size of the cells in the treemap display page. As mentioned, the size of each cell in the treemap display page will correspond to the value of a data attribute. For example, in the treemap display page 310 of FIG. 3, the size of the cells 340 corresponds to the "price" attribute of the wine bottles in the represented data set. Pursuant to the operation of flow diagram box 925, the authoring user can specify whether the size of the cell will map directly to the absolute value of the attribute or whether it will map to a normalized value. The authoring user can also specify a minimum cell size for each cell.

Figure 12:
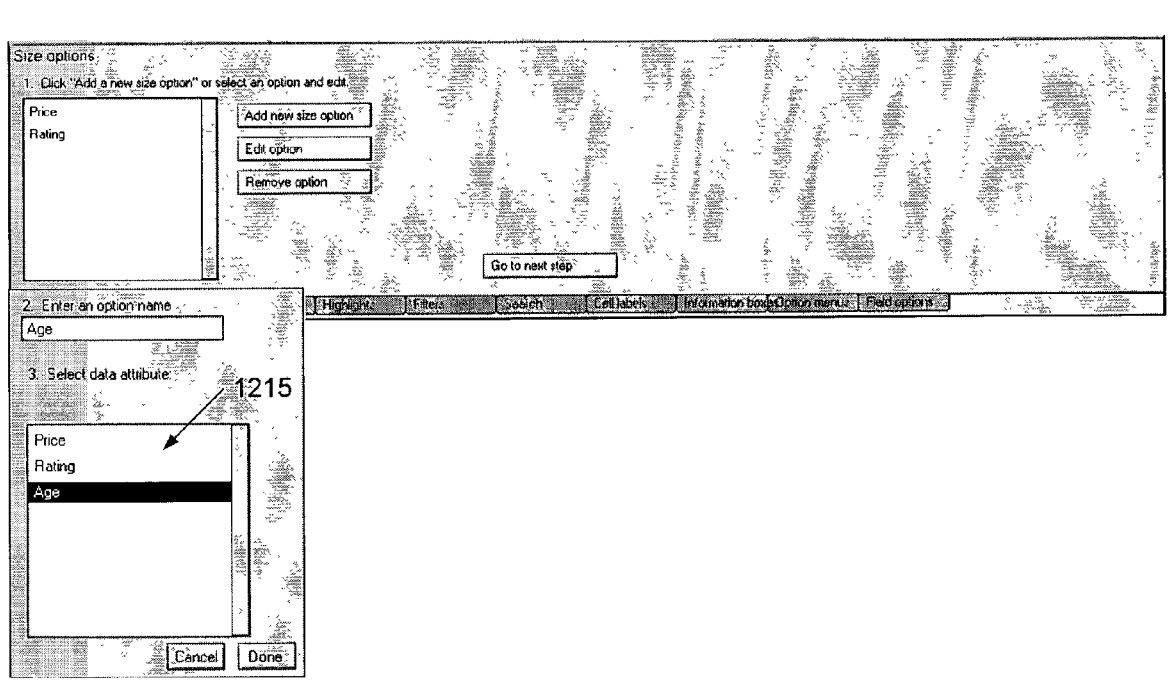
FIG. 12 shows a screen shot of a display page that can be used to define the sizing configuration for a treemap display page.

FIG. 12 shows an exemplary GUI display page 1210 that can be used to define the sizing configuration for a treemap display page. The display page 1210 provides the authoring user with a list 1215 of attributes that can be represented by the cell size. The authoring user can select from the list 1215 an attribute that is to be represented by cell size.

Figure 13:
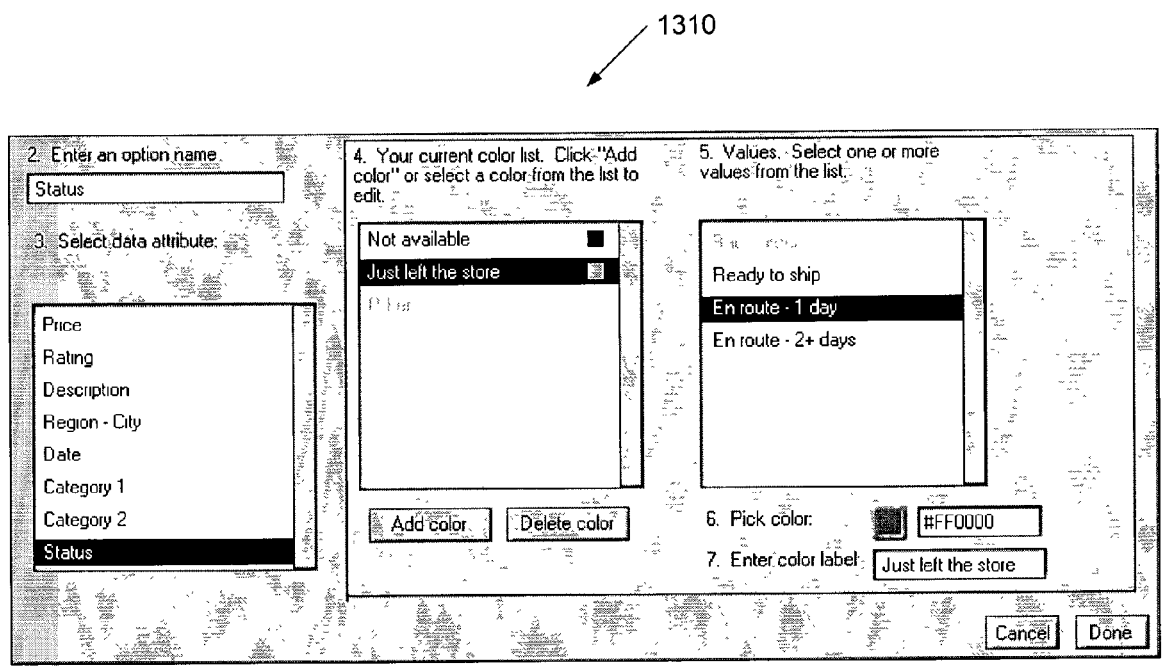
FIG. 13 shows a screen shot of a display page through which a user can define the color characteristics of the treemap display page.

Returning to FIG. 9, in the next operation, the authoring user defines the color configuration for the treemap display page, as represented by the flow diagram box numbered 930. Pursuant to this operation, the authoring user selects the data attribute that will be represented by the color of the cells in the treemap display page. The authoring user then defines a mapping between color and the possible range of values of the attribute. FIG. 13 shows an exemplary GUI display page 1310 through which a user can configure the color characteristics of the treemap display page. The GUI 1310 can provide the user with a list of attributes, as well as a listing of the value range for a selected attribute. The user can then select a particular attribute value and pick a color that will represent that attribute value on the treemap display page.

Figure 14:
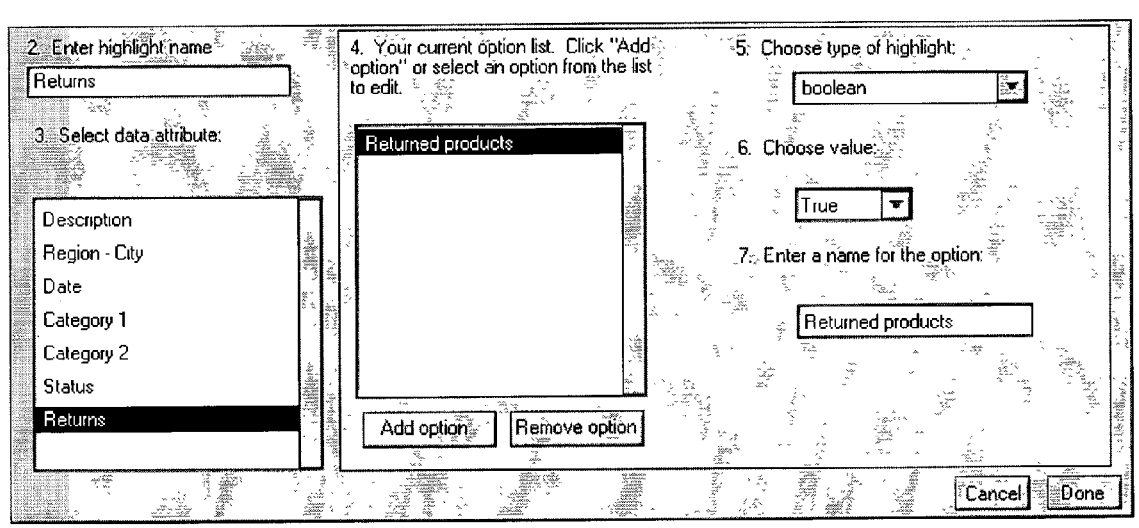
FIG. 14 shows a screen shot of a display page for defining a highlight control for the treemap display page.

With reference again to FIG. 9, in the next operation, the authoring user defines a highlight control interface for the treemap display, as represented by the flow diagram box numbered 935. In this operation, the authoring user can define a highlight control interface for the treemap display page, such as the highlight control box 430 shown in FIG. 4. The authoring user chooses a data attribute that can be the subject of a highlight control and also defines the value of the data attribute that can be highlighted on the treemap display page. The authoring user can also define an icon that will be used to identify highlighted cells on the treemap display page. FIG. 14 shows an exemplary GUI display page 1410 that can be presented to the authoring user for defining a highlight control for the treemap display page.

Figure 15:
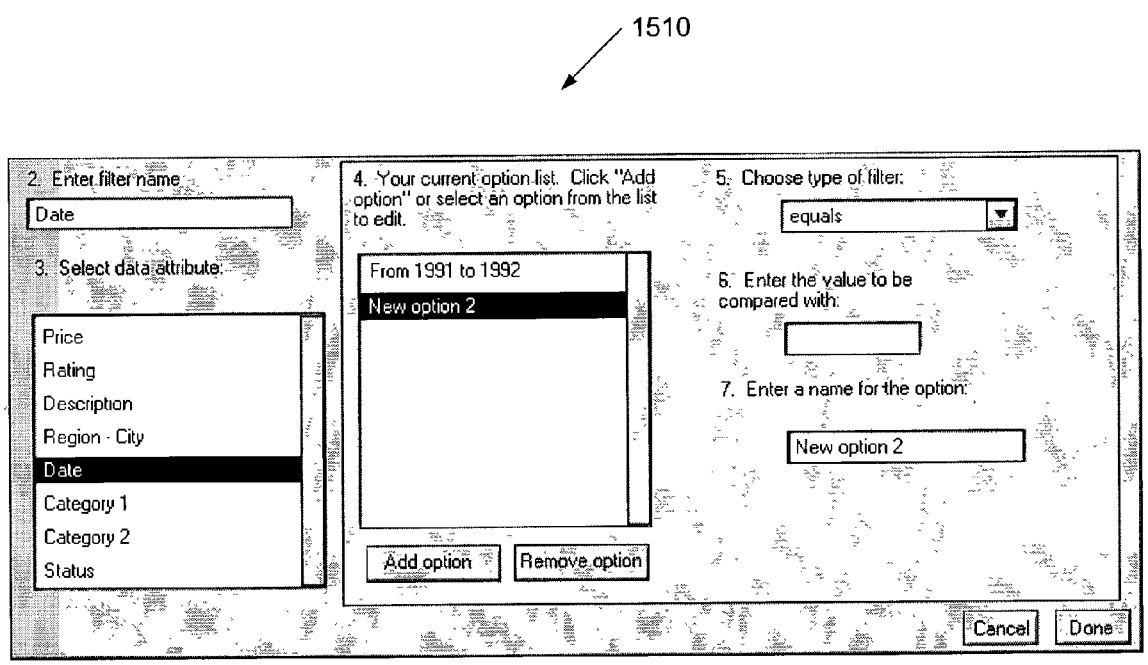
FIG. 15 shows a screen shot of a display page for defining a filter control of a treemap display page.

As shown in FIG. 9, in the next operation, the authoring user defines one or more filter controls for the treemap display page, as represented by the flow diagram box numbered 940. As mentioned, a filter control permits a viewer of a treemap display page to filter certain cells from display based on filtering criteria. For each filter control that is defined, the authoring user chooses data to be filtered against and how the data will be filtered. FIG. 15 shows an exemplary GUI display page 1510 that can be used to define a filter control.

Figure 16:
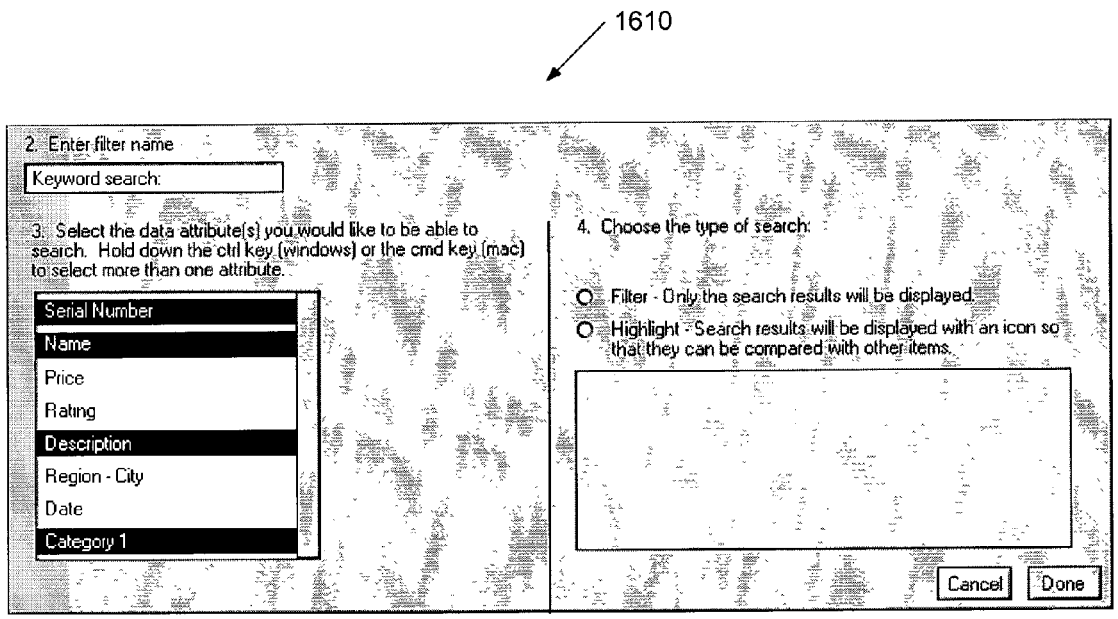
FIG. 16 shows a screen shot of a display page that can be used to define a search box for a treemap display page.

With reference again to FIG. 9, in the next operation, the authoring user can define one or more search boxes for the treemap display page, as represented by the flow diagram box numbered 945. The search boxes correspond to the search box 425 of the treemap display page 310 of FIG. 4. In this operation, the authoring user chooses data attribute(s) that can be searched and the type of search to be conducted when a search is initiated. FIG. 16 shows an exemplary GUI display page 1610 that can be used to define a search box.

Figure 17:
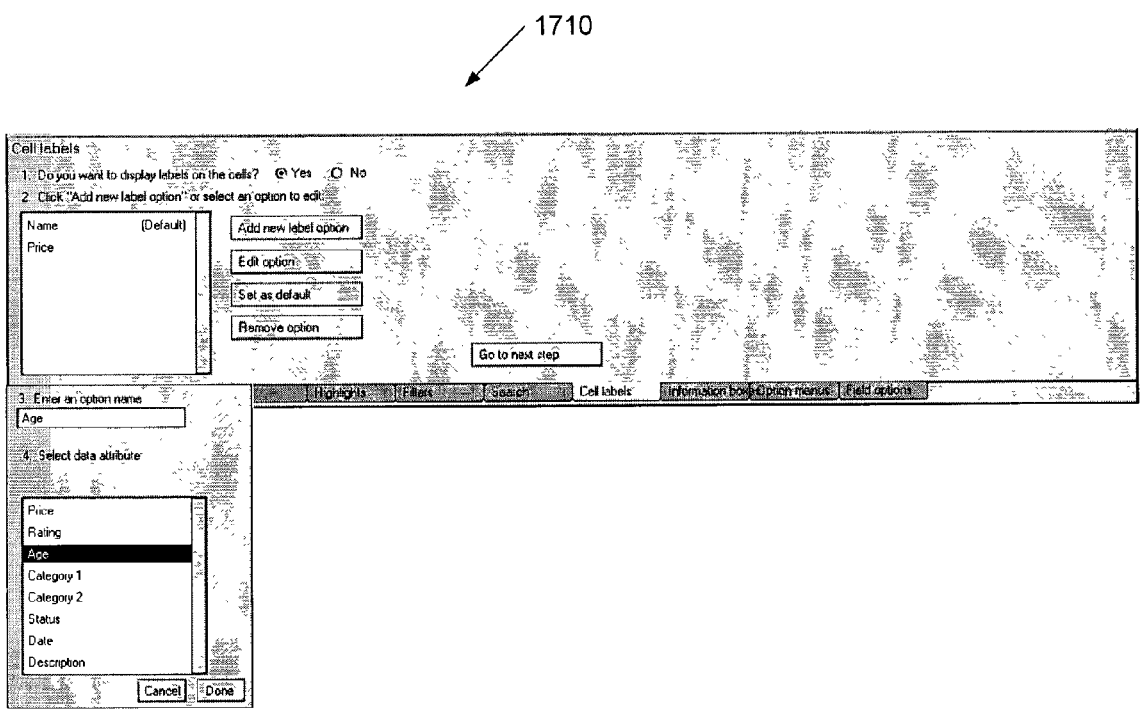
FIG. 17 shows a screen shot of a display page that can be used to define labels for a treemap display page.
Figure 18:
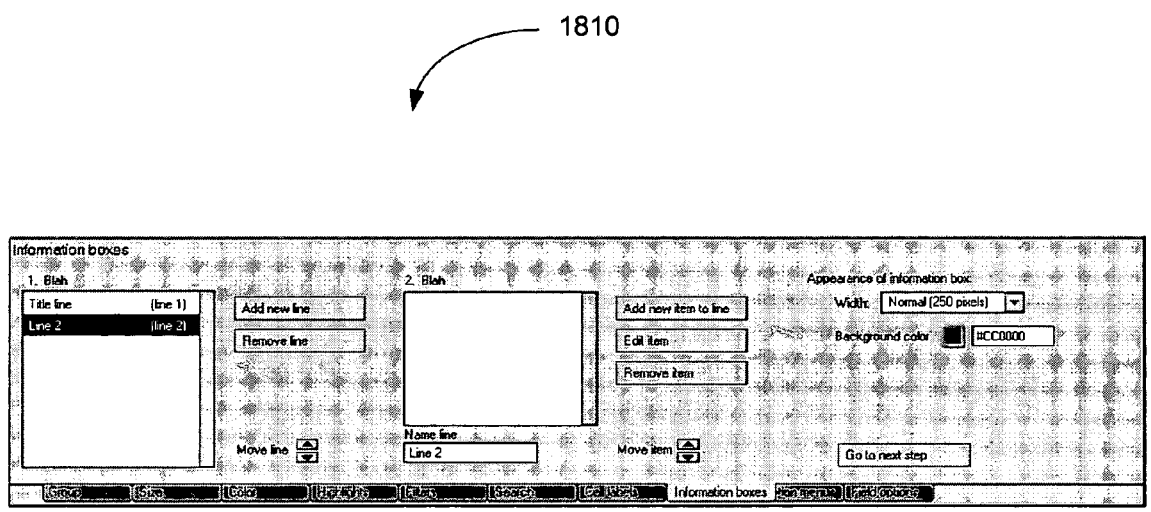
FIG. 18 shows a screen shot of a first display page for defining mouseover boxes for a treemap display page.
Figure 19:
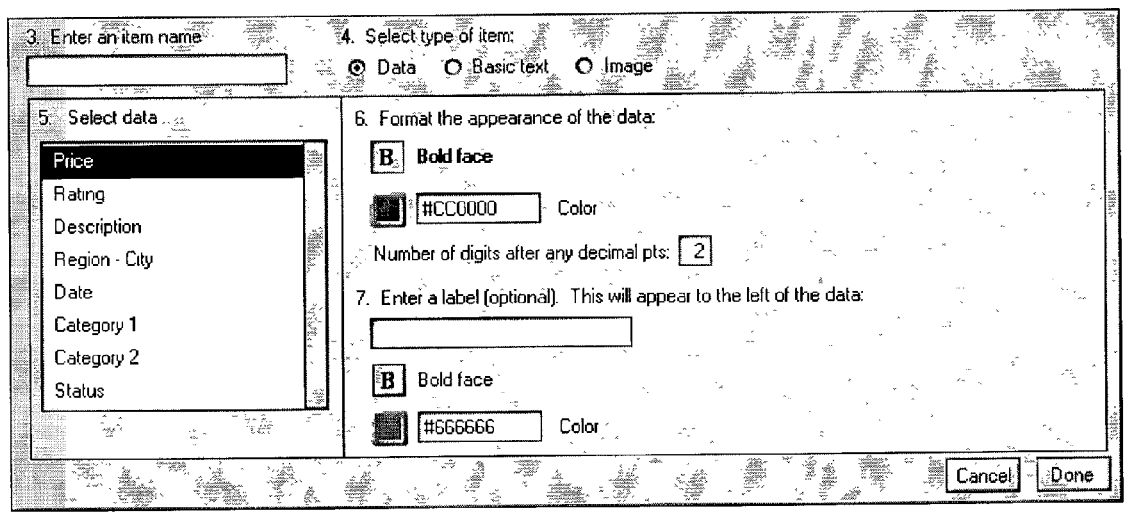
FIG. 19 shows a screen shot of a second display page for defining mouseover boxes for a treemap display page.
Figure 20:
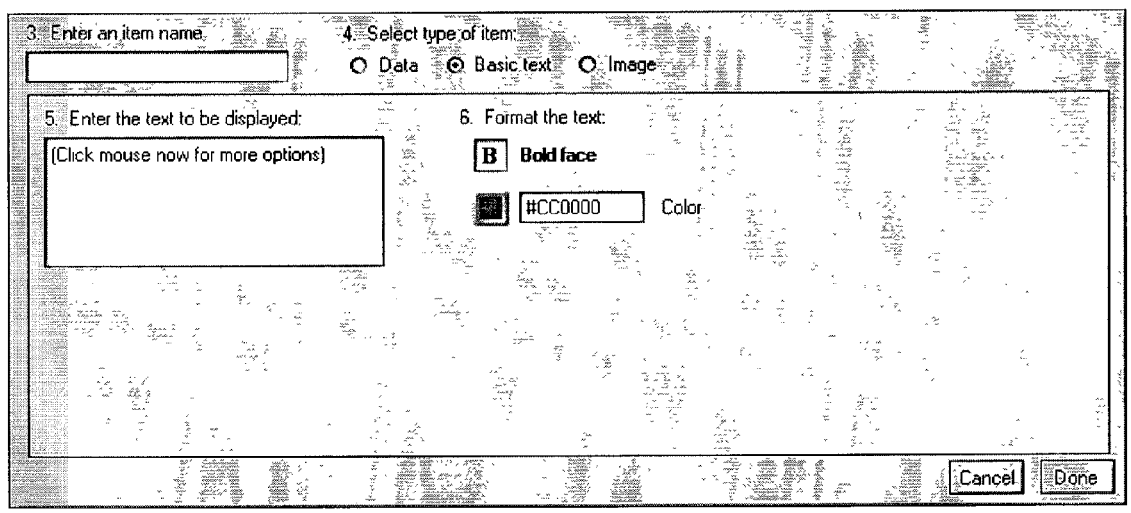
FIG. 20 shows a screen shot of a third display page for defining mouseover boxes for a treemap display page.
Figure 21:
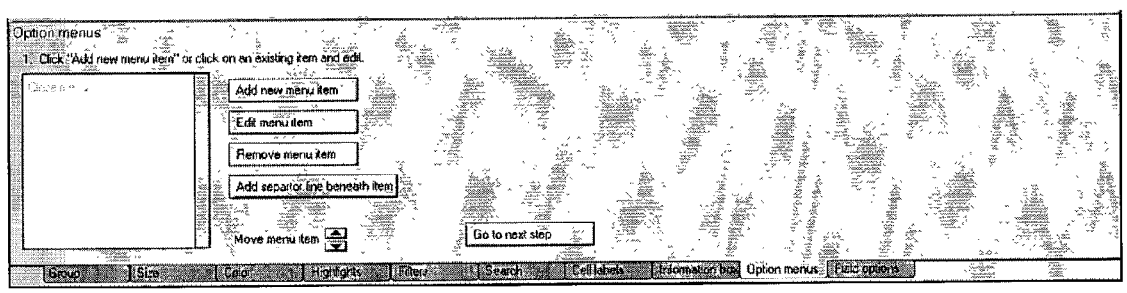
FIG. 21 shows a screen shot of a fourth display page for defining mouseover boxes for a treemap display page.
Figure 22:
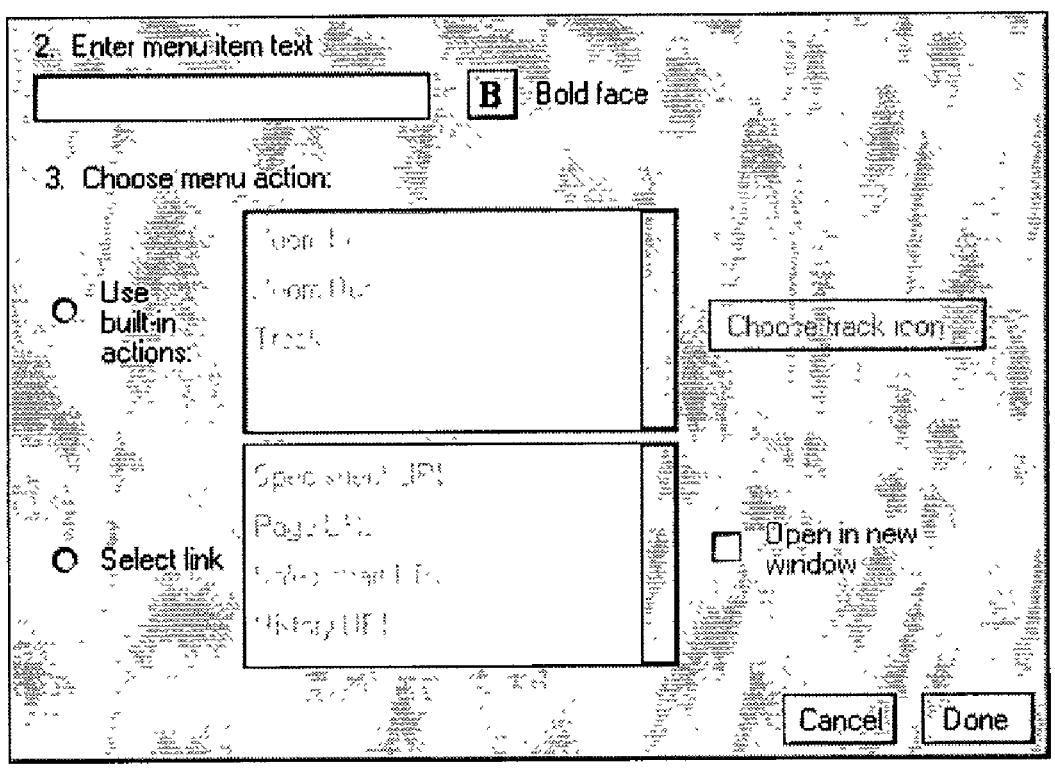
FIG. 22 shows a screen shot of a fifth display page for defining mouseover boxes for a treemap display page.
Figure 23:
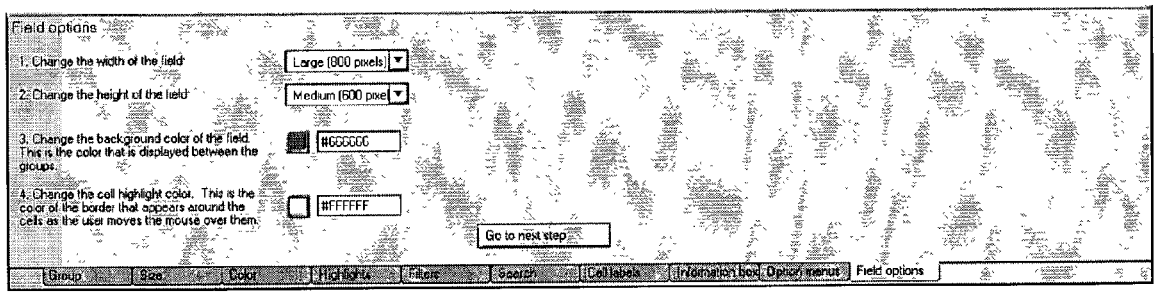
FIG. 23 shows a screen shot of a display page having a menu for adjusting general application appearance and function.

In the next operation, the authoring user defines the labels that will be used on the treemap display page, as represented by the flow diagram box numbered 950 of FIG. 9. As was described above with reference to the treemap display page 310 in FIG. 3, the treemap display page can include one or more labels 360. Pursuant to the operation of flow diagram box 950, the authoring user can define the labels for each group on the treemap display page. FIG. 17 shows an exemplary GUI display page 1710 that can be used to define labels for a treemap display page.

In the next operation, represented by the flow diagram box numbered 955 of FIG. 9, the authoring user defines one or more mouseover events, which are events that occur when a viewing user designates a treemap cell, such as, for example, with a cursor. For example, a mouseover event can include the appearance of a mouseover box when a cursor is moved over a cell on the treemap display page. Pursuant to this operation, the authoring user defines the format of the mouseover box, such as size, color, menu items, selectable action items during mouseclick, etc. FIGS. 18–23 show exemplary GUI display pages 1810 that can be used to define mouseover boxes for a treemap display page.

With reference again to FIG. 9, the next operation is represented by the flow diagram box numbered 965. In this operation, the authoring user can define other miscellaneous options for the treemap display page. For example, the user can define the width and height of the treemap portion of the treemap display page, background color for the page, and other miscellaneous items relating to the format of the treemap display page.

In the next operation, represented by the flow diagram box numbered 970, the authoring user finalizes the treemap display page that was just authored pursuant to the foregoing operations. This can be accomplished, for example, by the user selecting a "submit" or "save" button on the GUI display page. When the authoring user selects "submit", the client authoring application 230 assembles a specification 510 (shown in FIG. 5) that contains the display page configuration data that the authoring user provided pursuant to the operations shown in FIG. 9. The specification 510 also identifies the data object(s) associated with the treemap display page and also includes the name that the authoring user provided to the treemap display page. In one embodiment, the specification is written in XML. The client authoring application 230 then forwards the specification 510 to the server application 235, as shown in FIG. 5. The server application 235 can later use the specification 510 when responding to requests to view the treemap display page that was authored, as described more fully below. In one embodiment, the server application 235 creates a page view object 685 based on the specification, which the server application 235 can later use in responding to requests to view the treemap display page.

Viewing of Previously-Authored Treemap Display Page

Figure 24:
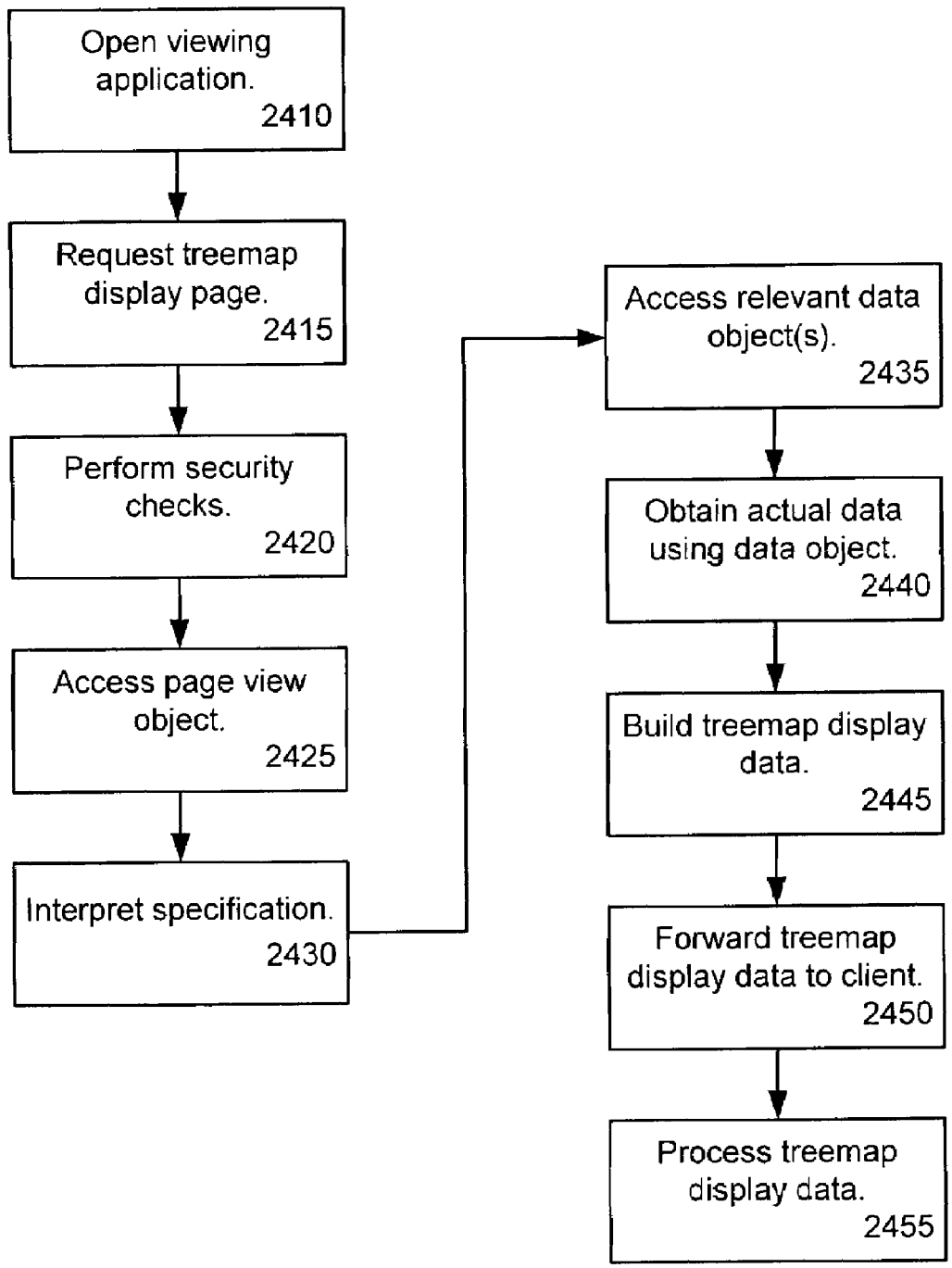
FIG. 24 shows a flow diagram that describes the operations involved with a process of requesting and viewing a previously-authored treemap display page.

FIG. 24 is a flow diagram that describes the operations involved in a process wherein a user requests and views a treemap display page that was previously authored by an authoring user via the client authoring application 230. A user that requests to view a treemap display page is referred to herein as a "viewing user". The process is described in the context of the viewing user viewing the treemap display page on the client computer 215 using the browser application 260.

In the first operation, represented by the flow diagram box numbered 2410, the viewing user opens the browser application 260 on the client computer 215 according to well-known methods. The viewing user then causes the browser application 260 to submit a request to the server application 235 to view a particular treemap display page, as represented by the flow diagram box numbered 2415. The viewing user can submit the request, for example, by identifying a uniform resource locator (URL) that corresponds to viewing of the requested treemap display page. The URL may point to a servlet that resides on the server computer 220 and that implements some of the operations described herein. Prior to responding to the request, the security services process 635 of the server application 235 can require the viewing user to perform a login process that verifies the viewing user's access rights to the server application 235.

In the next operation, represented by the flow diagram box numbered 2420, the runtime services process 652 of the server application 635 receives the request and performs a security check (via the security processes 635) to verify that the viewing user is authorized to access the requested treemap display page and the associated data. In this regard, the security services processes 635 can access a user object 645 and role object 647 (as shown in FIG. 6) that contain or point to access right data for the viewing user.

The next operation is represented by the flow diagram box numbered 2425, where the server application 235 accesses the page view object for the requested treemap display page. As previously discussed, each treemap display page that is authored using the client authoring application 230 has a corresponding page view object 685 (shown in FIG. 6), which contains information that the server application uses to generate treemap display data 515 that the browser application can process to draw a treemap display page on a computer screen. As mentioned, the page view object contains a reference to the specification for the corresponding treemap display page. The server application 235 then accesses and interprets the specification, as represented by the flow diagram box numbered 2430, such as by pulling the specification for the requested treemap display page from the data store 670 (shown in FIG. 6).

In the course of interpreting the specification, the server application 235 identifies the data object(s) that are related to the requested treemap display page. The server application 235 then accesses the relevant data objects via the data object handler 675 (shown in FIG. 6), as represented by the flow diagram box numbered 2435. As discussed above, a data object represents an abstraction of the data that will be used to instantiate and display a treemap display page on a computer. The server application 235 uses the data object to obtain relevant data that will be used to instantiate the requested treemap display page.

In the next operation, represented by the flow diagram box numbered 2440, the server application obtains the actual data that will be used to instantiate the treemap display page. The server application 235 can use the data objects, data object handler 675 and the data access component 680 (shown in FIG. 6) to obtain the data from one or more of the external data stores 227. Alternately, the server application 235 can access the data from the local data store 670, which data was previously obtained from the external data stores 227 and cached in the local data store 670.

The next operation is represented by the flow diagram box numbered 2445, where the server application 235 creates treemap display data 515, which is data that includes data that the browser application 260 can process in order to draw a treemap display page in a browser window. The treemap display data can be, for example, a markup language document (such as a Hypertext Markup Language (HTML) document) that contains the data that was obtained using the data objects, as well as the configuration data in the context of an actual treemap display page, such as the cell colors, cell sizes, menus, etc. The treemap display data 515 can also include one or more applets or applet references. The treemap display and applet information are received by the client computer browser 260, which can then produce the treemap display page on a suitable display screen of the computer, in accordance with display instructions known to those skilled in the art. The applet may be written, for example, in the Java programming language.

The runtime services process 652 of the server application 235 then forwards the treemap display data to the client machine 215, as represented by the flow diagram box numbered 2450. The browser application 260 on the client machine 215 then processes the treemap display data and generates the treemap display page on the computer 215. The viewing user can then examine and interact with the treemap display page.

Figure 25:
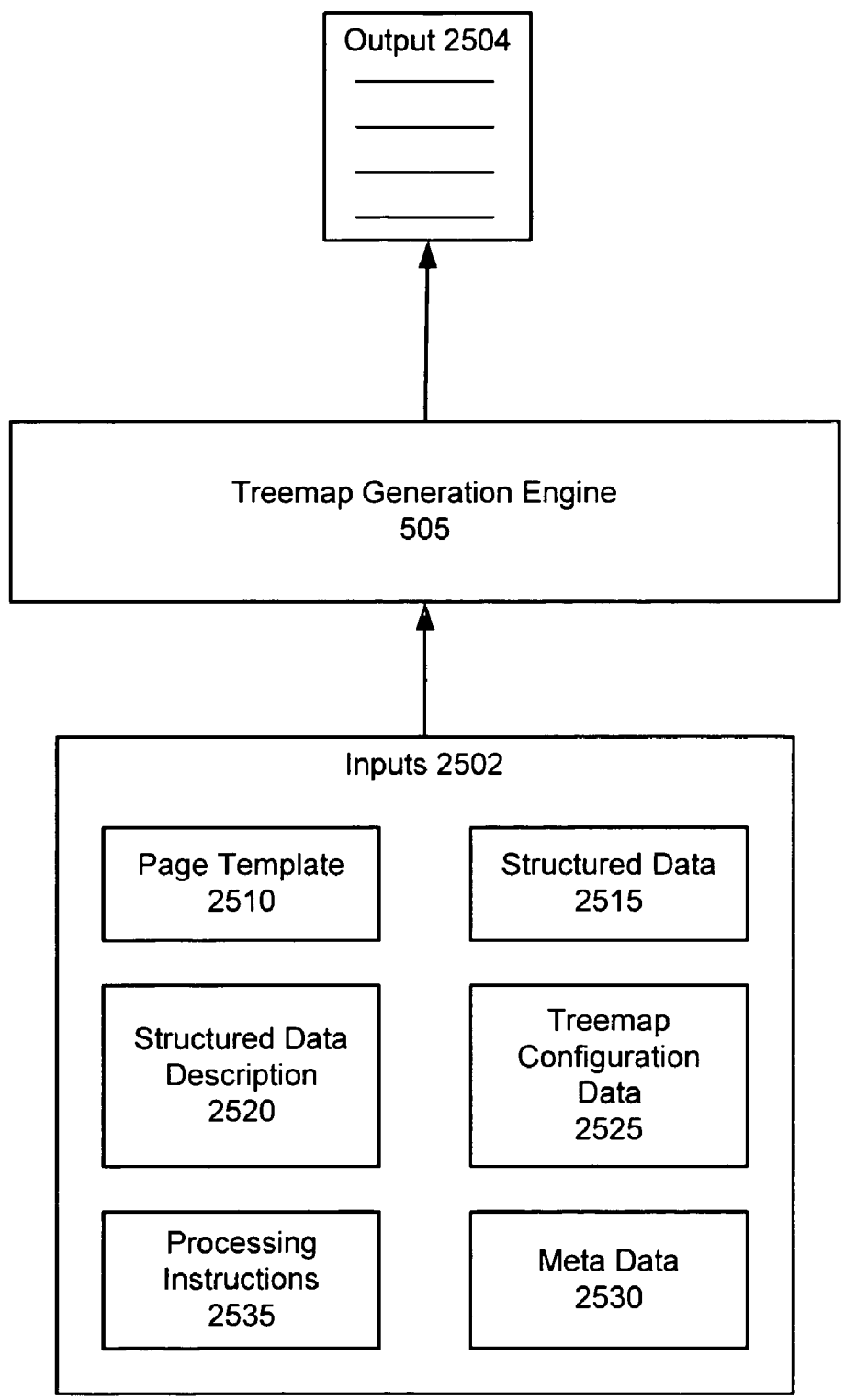
FIG. 25 is a block diagram that shows some data components that can comprise inputs to the treemap generation engine.

FIG. 25 is a block diagram that shows some data components that can comprise inputs 2502 to the treemap generation engine 505. FIG. 25 also shows the treemap display data that comprises an output 2504 of the treemap generation engine 505. The inputs 2502 can be provided by an authoring user via the client authoring application 230 or they can be provided or created at the server computer 220 on which the server application 235 resides.

The inputs 2502 include a page template 2510 that is a template that specifies the configuration of a treemap display page on which a treemap will appear. The inputs 2502 to the treemap generation engine 505 also include structured data 2515, which comprise a raw data set that will be represented by a treemap of the treemap display page. The structured data can be organized into one or more data elements, wherein each element includes a set of named attributes. Such an organization facilitates access by the treemap generation engine 505 to the attributes of each data element. The format of the structured data 2515 may vary. The structured data may be in an eXtensible Markup Language (XML) format or in a low-level representation. The structured data 2515 may comprise, for example, the output from an Internet search engine. The treemap generation engine 505 may perform some processing on the structured data 2515 to place it in a suitable format.

The inputs 2502 also include a structured data description 2520 that includes a description of the structured data 2515 for use by the treemap generation engine 505. The structured data description 2520 preferably includes information regarding the type of data and the format of the data in the structured data 2515. It should be appreciated that the structured data description 2520 may be explicitly or implicitly incorporated into the structured data 2515. Alternately, the structured data description may be implemented using the data objects 672 and data access components 680 discussed above.

Another input comprises treemap configuration data 2525, which is data that specifies how the treemap display will be configured. The treemap configuration data 2525 includes data such as colors, font sizes, fonts, and minimum cell sizes. The treemap configuration data can be received from the user pursuant to the operations described in the flow diagram of FIG. 9.

The inputs 2502 to the treemap generation engine 505 further include meta data 2530, which comprises high-level information regarding the structured data 2515 and the client computer 110. The meta data 2530 may include domain specific vocabulary that is used to determine various groupings of the data within the structured data 2515. The meta data 2530 may also include semantic information regarding the relationship of data elements in the structured data 2515.

A set of processing instructions 2535 comprises another input to the treemap generation engine 505. The processing instructions 2535 specify how the structured data 2515 and the meta data 2530 are used to form the treemap display. The processing instructions 2535 preferably identify the attributes in the data elements used to define a cell, and how the attributes are to be used and assembled for the treemap group, size, color, indicators, and filters. Additionally, the instructions describe any menu and mouseover window layouts that are associated with the treemap to be displayed. The processing instructions 2535 may also describe how special groupings will be synthesized from the structured data 2515 and the meta data 2530. The processing instructions 2535 also include information on how a raw set of data may be formatted as a treemap data structure. It should be understood that one or more of the inputs 2502 may be set to default values such that they are not generated by another process of the server 220.

As mentioned, the inputs 2502 can be provided by an authoring user via the client authoring application 230 or they can be provided or created at the server computer 220 on which the server application 235 resides. For example, the processing instructions 2535, the page template 2510, and the treemap configuration data 2525 can be received from the client authoring application 230, such as via the specification 510. The structured data 2515 and the meta data 2530 can be contained in data stores, such as the data store 227 or data store 670, for access by the server application 235. The treemap generation engine 505 uses the inputs 2502 to produce the output 2504, which comprises treemap display data, such as a markup language document that the browser 260 on the client computer 215 uses to draw a treemap display page, such as the page 310 shown in FIG. 3. The output 2504 of the treemap generation engine can also include one or more applets or applet references in the markup language document. The treemap and applet information are received by the client computer browser, which can then produce the treemap display page on a suitable display screen of the computer, in accordance with display instructions known to those skilled in the art. The applet may be written, for example, in the Java programming language.

Figure 26:
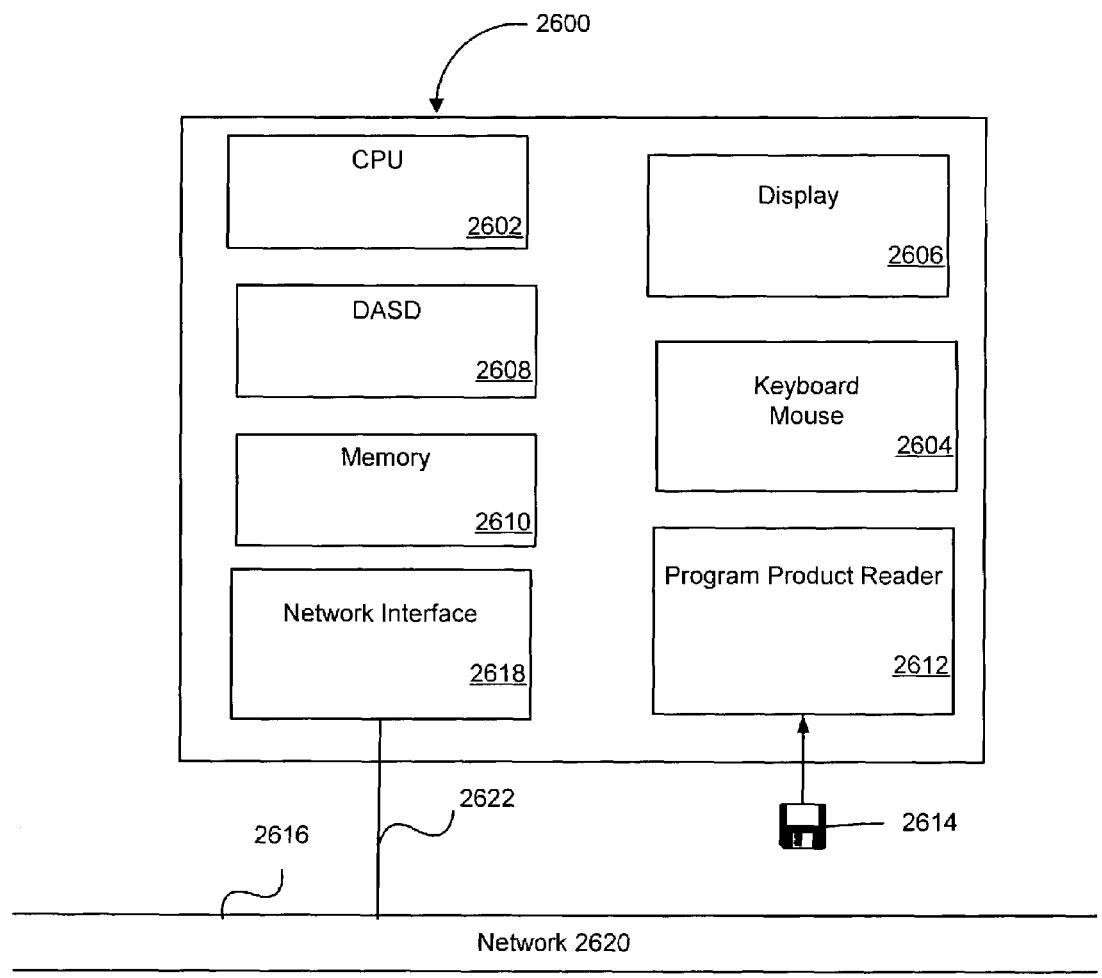
FIG. 26 is a block diagram of a computer of the system shown in FIG. 2, illustrating the hardware components for one of the computers.

FIG. 26 is a block diagram of a computer of the system shown in FIG. 2, illustrating the hardware components for one of the computers. Those skilled in the art will appreciate that the computers 210, 215, 220 can all have a similar computer construction to the computer shown in FIG. 26.

FIG. 26 is a block diagram of an exemplary computer 2600 such as might comprise any of the computers shown in FIG. 2. The computer 2600 operates under control of a central processor unit (CPU) 2602. The configuration of the computer can vary.

With reference still to FIG. 26, a computer user can input commands and data from input device(s) such as a keyboard and/or computer mouse 2604, and can view inputs and computer output at a display 2606. The display is typically a video monitor or flat panel display. The computer 2600 also includes a direct access storage device (DASD) 2608, such as a hard disk drive. The memory 2610 typically comprises volatile semiconductor random access memory (RAM). Each computer can include a program product reader 2612 that accepts a program product storage device 2614, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 2600 can communicate with the others over a computer network 2620 (such as the Internet or an intranet) through a network interface 2618 that enables communication over a connection 2622 between the network 2620 and the computer. The network interface 2618 typically comprises, for example, a Network Interface Card (NIC) or a modem that permits communications over a variety of networks.

The CPU 2602 operates under control of programming steps that are temporarily stored in the memory 2610 of the computer 2600. When the programming steps are executed, the computer performs its functions. Thus, the programming steps implement the functionality of the generation engine described herein. The programming steps can be received from the DASD 2608, through the program product storage device 2614, or through the network connection 2622. The program product storage drive 2612 can receive a program product 2614, read programming steps recorded thereon, and transfer the programming steps into the memory 2610 for execution by the CPU 2602. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 2610 over the network 2620. In the network method, the computer receives data including program steps into the memory 2610 through the network interface 2618 after network communication has been established over the network connection 2622 by well-known methods that will be understood by those skilled in the art without further explanation. The program steps are then executed by the CPU 2602 thereby comprising a computer process.

It should be understood that all of the computers of the system illustrated in FIG. 2 can have a construction similar to that shown in FIG. 26, so that details described with respect to the computer 2600 will be understood to apply to all computers 210, 215, 220 of the system. Alternatively, any of the computers can have an alternative construction, so long as they can communicate with the other computers and support the functionality described herein.

The present invention has been described above in terms of one or more embodiments so that an understanding of the present invention can be conveyed. There are, however, many configurations for the disclosed systems and methods not specifically described herein but with which the present invention is applicable. The present invention should therefore not be seen as limited to the particular embodiment described herein, but rather, it should be understood that the present invention has wide applicability with respect to network systems and data display systems generally. All modifications, variations, or equivalent arrangements and implementations that are within the scope of the attached claims should therefore be considered within the scope of the invention.

We claim:

1. A method of obtaining inputs from an authoring user for authoring of a treemap display page, comprising:

presenting to the authoring user a first graphical user interface that can receive a data definition from the authoring user, wherein the data definition defines a set of data to be represented by a treemap of the treemap display page; presenting to the authoring user a second graphical user interface that can receive a treemap configuration definition from the authoring user, wherein the treemap configuration definition defines the format of the treemap display page; and generating at least one electronic specification from the data definition and the treemap configuration definition, wherein the electronic specification can be processed by a computer at a later time, using the data definition to retrieve values of the data that are current as of the later time, to generate treemap display data that can be used to draw the treemap display page.

2. A method as defined in claim 1, wherein the graphical user interfaces include selectable fields and menus that constrain the inputs that the authoring user provides in defining the data and treemap display page format.

3. A method as defined in claim 1, additionally comprising presenting the authoring user with a list of data attributes that can be represented by the treemap of the treemap display page.

4. A method as defined in claim 1, wherein the second graphical user interface enables the authoring user to select a data attribute that will be represented by the size of cells in the treemap of the treemap display page.

5. A method as defined in claim 1, wherein the second graphical user interface enables the authoring user to select a data attribute that will be represented by the color of cells in the treemap of the treemap display page.

6. A method as defined in claim 1, wherein the second graphical user interface enables the authoring user to select a data attribute that will be used to group cells in the treemap of the treemap display page.

7. A method as defined in claim 1, wherein the second graphical user interface enables the authoring user to define mouseover events for the treemap display page.

8. A method as defined in claim 1, wherein the second graphical user interface enables the authoring user to define menus for the treemap display page.

9. A method as defined in claim 1, wherein the second graphical user interface enables an authoring user to define filter controls for the treemap display page.

10. The method of claim 1 wherein the authoring user is authenticated by a server process that verifies that the authoring user has authorization to store an electronic specification on the server.

11. The method of claim 1, further comprising storing the electronic specification in a data store on a server, and wherein the set of data is chosen from a list of attributes returned by a server process in response to a query from the authoring user.

12. A system for obtaining inputs from an authoring user for authoring of a treemap display page, the system comprising:

a memory in which instructions and data are stored; and
a processor, coupled to the memory, such that the processor receives the instructions stored in the memory and executes the instructions to perform operations comprising:

presenting to the authoring user a first graphical user interface that can receive a data definition from the user, wherein the data definition defines a set of data to be represented by a treemap of the treemap display page;

presenting to the authoring user a second graphical user interface that can receive a treemap configuration definition from the authoring user, wherein the treemap configuration definition defines the format of the treemap display page; and generating at least one electronic specification from the data definition and the treemap configuration definition, wherein the electronic specification can be processed by a computer at a later time, using the data definition to retrieve values of the data that are current as of the later time, to generate treemap display data that can be used to draw the treemap display page.

13. The system of claim 12 wherein the authoring user is authenticated by a server process that verifies that the authoring user has authorization to store an electronic specification on the server.

14. The system of claim 12, wherein the operations further comprise storing the electronic specification in a data store on a server, and wherein the set of data is chosen from a list of attributes returned by a server process in response to a query from the authoring user.

15. A program product for use in a computer that executes program instructions recorded in a computer-readable media, the program product comprising:

a recordable media; and
computer-readable instructions recorded on the recordable media, comprising instructions executable by the computer to perform operations comprising:

presenting to an authoring user a first graphical user interface that can receive a data definition from the user, wherein the data definition defines a set of data to be represented by a treemap of the treemap display page;

presenting to the authoring user a second graphical user interface that can receive a treemap configuration definition from the authoring user, wherein the treemap configuration definition defines the format of the treemap display page; and generating at least one electronic specification from the data definition and the treemap configuration definition, wherein the electronic specification can be processed by a computer at a later time, using the data definition to retrieve values of the data that are current as of the later time, to generate treemap display data that can be used to draw the treemap display page.

16. The program of claim 15 wherein the authoring user is authenticated by a server process that verifies that the authoring user has authorization to store an electronic specification on the server.

17. The program of claim 15, wherein the operations further comprise storing the electronic specification in a data store on a server, and wherein the set of data is chosen from a list of attributes returned by a server process in response to a query from the authoring user.

18. A method of authoring a computer-generated treemap display, comprising:

presenting an authoring user with at least one graphical user interface through which the authoring user can provide information receiving the information from the authoring user that defines the format of a treemap display page;

receiving information from an authoring user that defines a set of data to be represented by a treemap on the treemap display page; and generating an electronic specification, wherein the electronic specification can be processed by a computer at a later time, using the data definition to retrieve values of the data that are current as of the later time, to generate treemap display data that can be used to draw the treemap display page.

19. A method as defined in claim 18, additionally comprising sending the electronic specification to a computer that can generate the treemap display data.

20. A method as defined in claim 18, wherein the graphical user interface is presented in a wizard format that leads the authoring user through steps of providing information that defines the format of the treemap display page and the set of data to be represented by a treemap on the treemap display page.

21. A program product for use in a computer that executes program instructions recorded in a computer-readable media to perform a method of authoring a computer-generated treemap display, the program product comprising:

a recordable media; and computer-readable instructions recorded on the recordable media, comprising instructions executable by the computer to perform operations comprising:

presenting an authoring user with at least one graphical user interface through which the authoring user can provide information;

receiving the information from the authoring user that defines the format of a treemap display page;

receiving information from an authoring user that defines a set of data to be represented by a treemap on the treemap display page; and generating an electronic specification, wherein the electronic specification can be processed by a computer to generate treemap display data that can be used to draw the treemap display page.

22. A program product as defined in claim 21, wherein the graphical user interface is presented in a wizard format that leads the authoring user through steps of providing information that defines the format of the treemap display page and the set of data to be represented by a treemap on the treemap display page.

23. A system for authoring a computer-generated treemap display, the system, comprising:

a memory in which instructions and data are stored; and a processor, coupled to the memory, such that the processor receives the instructions stored in the memory and executes the instructions to perform operations comprising:

presenting an authoring user with at least one graphical user interface through which the authoring user can provide information:

receiving the information from the authoring user that defines the format of a treemap display page;

receiving information from an authoring user that defines a set of data to be represented by a treemap on the treemap display page; and generating an electronic specification, wherein the electronic specification can be processed by a computer to generate treemap display data that can be used to draw the treemap display page.

24. A method of authoring a computer-generated treemap display, comprising the steps of:

guiding an authoring user in creating a treemap configuration definition by providing a selectable menu of data objects, wherein the authoring user creates a data definition from the menu; and creating a treemap configuration definition capable of generating treemap display data at a later time, using data retrieved at the later time.

25. A method as defined in claim 24, wherein the step of guiding an authoring user in creating a treemap configuration definition comprises:

providing a selectable menu of data attributes, wherein the authoring user selects one or more data attributes that are used to group cells of the treemap into one or more groups; and providing a user interface by which the authoring user defines the values of data attributes within one or more of the groups.

26. A method as defined in claim 24, wherein the step of guiding an authoring user in creating a treemap configuration definition comprises:

providing a selectable menu of data attributes, wherein the authoring user selects a data attribute that is represented by the size of cells in the treemap display page; and providing a user interface wherein the authoring user specifies, from a set of choices, a function on the value of the data attribute that determines the size of cells, the set of choices comprising:

absolute value of the data attribute; and normalized value of the data attribute.

27. A method as defined in claim 24, wherein the step of guiding an authoring user in creating a treemap configuration definition comprises:

providing a selectable menu of data attributes wherein the authoring user selects a data attribute that is represented by the color of cells in the treemap display page;

providing a listing of the value range for the selected data attribute; and providing a user interface wherein the authoring user selects one or more values from the value range and picks one or more colors that represent the values.

28. A method as defined in claim 24, wherein the step of guiding an authoring user through one or more aspects of creating a treemap configuration definition comprises:

providing a selectable menu of data attributes wherein the authoring user selects one or more data attributes that are included in a mouseover box;

providing a user interface wherein the authoring user formats the appearance of the mouseover box.

29. A method as defined in claim 24, wherein the step of guiding an authoring user in creating a treemap configuration definition comprises:

providing a user interface wherein the authoring user defines one or more filters, wherein the filters are comprised of a label and a logical expression on one or more data attributes, wherein the filters appear on the treemap display as selectable choices for an end user.

30. A method as defined in claim 24, wherein the step of guiding an authoring user in creating a treemap configuration definition comprises:

providing a user interface wherein the authoring user defines an ordered set of one or more label options for labels that appear in the bodies of cells in the treemap display, wherein the labels comprise data attributes, wherein the label options appear on the treemap display as selectable choices for an end user.

31. A method as defined in claim 24, wherein the step of guiding an authoring user in creating a treemap configuration definition comprises:

providing a user interface wherein the authoring user defines one or more highlights, wherein the highlights comprise a name, an indicator type, and a logical expression on one or more data attributes, wherein the highlights appear on the treemap display as selectable choices for an end user.

32. A method as defined in claim 24, wherein the treemap display data comprises a markup language document, wherein the markup language document comprises references to applets and wherein the applets reside on a server computer.

33. A method as defined in claim 24, wherein the treemap configuration definition and the data definition are received from a client computer over a computer network, and wherein a server application performs an access control method, comprising the steps of:

receiving the name of the authoring user; and verifying that the authoring user is authorized to create treemap configuration definitions.

34. A system for authoring a treemap, comprising:

a server memory in which server instructions and server data are stored; and a server processor, coupled to the server memory, such that the server processor receives the server instructions stored in the server memory and executes the server instructions to perform operations comprising:

taking as input a specification of a tree map and one or more access criteria; and creating a page view object comprising the specification and the access criteria; and a client memory in which client instructions and client data are stored; and a client processor, coupled to the client memory, such that the client processor receives the client instructions stored in the client memory and executes the client instructions to perform operations comprising:

presenting an authoring user interface allowing an authoring user to define the treemap specification and the one or more access criteria; and presenting an authoring user interface allowing the authoring user to direct execution of the server instructions, thereby creating the page view object on the server, providing as input the treemap specification and the access criteria.

35. The system of claim 34, wherein the server executes the server instructions to perform operations to manage access to the page view object for a viewing user, comprising:

accepting as input a name of the viewing user and a name of the page view object;

retrieving one or more access criteria associated with the page view object;

granting access to the page view object if the access criteria match one or more user criteria associated with the viewing user; and denying access to the page view object if the access criteria do not match the one or more user criteria associated with the viewing user; and wherein the client executes the client instructions to perform operations to manage access to the page view object for the viewing user comprising:

presenting an authoring user interface allowing the authoring user to assign the one or more access criteria to the page view object, comprising.

* * * * *